US010526548B2

(12) United States Patent
Moravec et al.

(10) Patent No.: US 10,526,548 B2
(45) Date of Patent: Jan. 7, 2020

(54) HYDROCARBON-IN-WATER PURIFICATION SYSTEM

(71) Applicant: DONALDSON COMPANY, INC., Minneapolis, MN (US)

(72) Inventors: Davis B. Moravec, Minneapolis, MN (US); Andrew J. Dallas, Minneapolis, MN (US); Joseph M. Block, Minneapolis, MN (US); Bradly G. Hauser, Minneapolis, MN (US); Cullen E. Hall, Minneapolis, MN (US); Mark C. Shepherd, Minneapolis, MN (US); Mike J. Madsen, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 115 days.

(21) Appl. No.: 15/558,614

(22) PCT Filed: Mar. 17, 2016

(86) PCT No.: PCT/US2016/022901
§ 371 (c)(1),
(2) Date: Sep. 15, 2017

(87) PCT Pub. No.: WO2016/149512
PCT Pub. Date: Sep. 22, 2016

(65) Prior Publication Data
US 2018/0079972 A1 Mar. 22, 2018

Related U.S. Application Data

(60) Provisional application No. 62/134,279, filed on Mar. 17, 2015.

(51) Int. Cl.
*C10G 33/06* (2006.01)
*C02F 1/28* (2006.01)
(Continued)

(52) U.S. Cl.
CPC ............ *C10G 33/06* (2013.01); *B01D 15/363* (2013.01); *B01D 61/10* (2013.01); *B01J 20/20* (2013.01);
(Continued)

(58) Field of Classification Search
CPC ........ C10G 33/06; C10G 33/08; C10G 25/02; C02F 1/40; C02F 1/42; C02F 1/283;
(Continued)

(56) References Cited

U.S. PATENT DOCUMENTS 583,382 A    5/1897   Lüer
3,017,347 A * 1/1962 Kratz .................... B01D 37/00
                                               210/264

(Continued)

FOREIGN PATENT DOCUMENTS

CN    1036030 A    10/1989
CN    1478727 A    3/2004
(Continued)

OTHER PUBLICATIONS

Abe et al., "Letter to the Editor: Spontaneous Breaking of Microemulsion by Surface-Modified Ion Exchange Resins," Mar. 15, 1990, *Journal of Colloid and Interface Science*, 135(2):598-600.
(Continued)

*Primary Examiner* — Joseph W Drodge
(74) *Attorney, Agent, or Firm* — Mueting, Raasch & Gebhardt, P.A.

(57) ABSTRACT

A hydrocarbon-in-water purification system includes a high capacity hydrocarbon absorber stage having a high capacity hydrocarbon absorber material and an inlet configured to receive a hydrocarbon-in-water dispersion from a fuel system. A polishing hydrocarbon absorber stage is in liquid communication and downstream of the high capacity hydrocarbon absorber stage including polishing activated carbon.

(Continued)

The high capacity hydrocarbon absorber material has a greater saturation capacity than the polishing activated carbon and the polishing activated carbon has a greater polishing capacity than the high capacity hydrocarbon absorber material. A method for controlling and managing the evacuation of water from the hydrocarbon-in-water purification system includes tracking the purification state of water volumes and the bed loading states of purification beds defined in the water filter.

18 Claims, 9 Drawing Sheets

(51) Int. Cl.
    *B01J 41/05*      (2017.01)
    *B01D 15/36*    (2006.01)
    *C02F 1/42*      (2006.01)
    *C10G 33/08*    (2006.01)
    *B01J 20/28*     (2006.01)
    *B01J 20/26*     (2006.01)
    *C02F 1/00*      (2006.01)
    *B01D 61/10*    (2006.01)
    *B01J 20/20*     (2006.01)
    *C02F 101/32*   (2006.01)
    *C02F 103/36*   (2006.01)

(52) U.S. Cl.
    CPC ........... *B01J 20/261* (2013.01); *B01J 20/262* (2013.01); *B01J 20/2805* (2013.01); *B01J 20/28033* (2013.01); *B01J 20/28045* (2013.01); *B01J 41/05* (2017.01); *C02F 1/008* (2013.01); *C02F 1/28* (2013.01); *C02F 1/42* (2013.01); *C10G 33/08* (2013.01); *B01J 2204/005* (2013.01); *B01J 2220/46* (2013.01); *B01J 2220/48* (2013.01); *B01J 2220/50* (2013.01); *C02F 1/283* (2013.01); *C02F 1/285* (2013.01); *C02F 2001/422* (2013.01); *C02F 2101/32* (2013.01); *C02F 2103/365* (2013.01); *C02F 2209/005* (2013.01); *C02F 2209/44* (2013.01); *C02F 2209/445* (2013.01); *C02F 2301/08* (2013.01)

(58) Field of Classification Search
    CPC .......... C02F 1/78; C02F 1/32; C02F 2101/32; C02F 2101/325; C02F 1/50; C02F 2103/365; C02F 2209/445; C02F 2001/422; C02F 1/008; C02F 1/28; C02F 1/281; C02F 1/285; C02F 2209/005; C02F 2209/44; B01D 15/363; B01D 61/10; B01D 15/36; B01D 17/02; B01D 17/0202; B01D 17/04; B01J 41/05; B01J 20/20; B01J 20/28057; B01J 2204/005; B01J 20/28; B01J 20/28033; B01J 20/28045; B01J 20/2805; B01J 20/261; B01J 20/262; B01J 41/00; B01J 41/18; B01J 2220/46; B01J 2220/48; B01J 2220/4806; B01J 2220/4812; B01J 2220/50; B01J 2220/603
    USPC .... 210/263, 264, 266, 502.1, 683, 691, 692, 210/693, 694, 798, 908; 516/135, 136, 516/141, 143
See application file for complete search history.

(56) References Cited

U.S. PATENT DOCUMENTS

| | | | | |
|---|---|---|---|---|
| 3,704,990 | A * | 12/1972 | Sarem | C09K 8/588 |
| | | | | 166/400 |
| 3,729,410 | A * | 4/1973 | Abadie | B01D 17/0202 |
| | | | | 210/671 |
| 4,105,549 | A | 8/1978 | Kakumoto et al. | |
| 4,534,865 | A | 8/1985 | Sundberg et al. | |
| 4,676,908 | A * | 6/1987 | Ciepiela | B01D 61/025 |
| | | | | 204/524 |
| 4,790,941 | A | 12/1988 | Taylor | |
| 5,094,747 | A * | 3/1992 | Johnson | B60K 15/03504 |
| | | | | 210/266 |
| 5,236,595 | A * | 8/1993 | Wang | B01J 39/04 |
| | | | | 210/141 |
| 5,549,832 | A * | 8/1996 | Ische | C09K 5/20 |
| | | | | 210/694 |
| 5,692,461 | A * | 12/1997 | Crovato | F01P 11/06 |
| | | | | 123/41.14 |
| 5,900,153 | A * | 5/1999 | Sanford | C10G 31/09 |
| | | | | 210/282 |
| 5,922,198 | A * | 7/1999 | Kelly | B01J 39/04 |
| | | | | 210/241 |
| 6,416,670 | B1 * | 7/2002 | Cummings | B01D 15/00 |
| | | | | 210/673 |
| 6,893,571 | B2 | 5/2005 | Harenbrock et al. | |
| 7,850,846 | B2 | 12/2010 | De La Azuela et al. | |
| 8,388,834 | B2 | 3/2013 | Rösgen et al. | |
| 8,636,900 | B2 | 1/2014 | Braunheim et al. | |
| 9,593,032 | B2 * | 3/2017 | Moore | C02F 1/283 |
| 2002/0153324 | A1 | 10/2002 | Gerard | |
| 2003/0114350 | A1 * | 6/2003 | Schmitt | B01J 20/183 |
| | | | | 510/466 |
| 2004/0011741 | A1 | 1/2004 | Hirata et al. | |
| 2008/0083666 | A1 * | 4/2008 | Brown | C02F 9/00 |
| | | | | 210/202 |
| 2008/0105620 | A1 * | 5/2008 | Hicks | C02F 9/005 |
| | | | | 210/681 |
| 2008/0302104 | A1 * | 12/2008 | Hwang | F02C 1/005 |
| | | | | 60/723 |
| 2009/0084734 | A1 | 4/2009 | Yencho | |
| 2010/0096304 | A1 | 4/2010 | Gänswein et al. | |
| 2012/0091055 | A1 * | 4/2012 | Torras-Pique | C02F 1/42 |
| | | | | 210/264 |
| 2012/0241385 | A1 | 9/2012 | McCarthy et al. | |
| 2013/0001155 | A1 * | 1/2013 | Neubauer | B01D 39/1623 |
| | | | | 210/489 |
| 2013/0056204 | A1 | 3/2013 | Ray et al. | |
| 2013/0299404 | A1 | 11/2013 | Nakamura | |
| 2013/0313191 | A1 * | 11/2013 | Wolf | C02F 9/00 |
| | | | | 210/638 |
| 2014/0034577 | A1 | 2/2014 | Trobaugh et al. | |
| 2014/0034580 | A1 * | 2/2014 | Chen | B01D 36/003 |
| | | | | 210/708 |
| 2014/0066668 | A1 * | 3/2014 | Lorenz, II | C07C 29/76 |
| | | | | 568/913 |
| 2014/0066680 | A1 * | 3/2014 | Miao | B01J 37/031 |
| | | | | 585/625 |
| 2014/0221688 | A1 | 8/2014 | Corredores et al. | |
| 2015/0136696 | A1 * | 5/2015 | Bedard | C02F 1/26 |
| | | | | 210/638 |
| 2015/0225655 | A1 | 8/2015 | Adams et al. | |
| 2015/0332181 | A1 * | 11/2015 | Underwood | C02F 9/00 |
| | | | | 705/7.12 |
| 2017/0021295 | A1 | 1/2017 | Willems et al. | |

FOREIGN PATENT DOCUMENTS

| | | |
|---|---|---|
| CN | 1180686 C | 12/2004 |
| CN | 101939261 A | 1/2011 |
| CN | 102596825 A | 7/2012 |
| EP | 2 878 352 A1 | 6/2015 |
| GB | 826144 * | 12/1959 |
| GB | 826144 A | 12/1959 |

(56) References Cited

FOREIGN PATENT DOCUMENTS

| GB | 1496034 A | 12/1977 |
|----|-----------|---------|
| WO | WO 2016/149506 A1 | 9/2016 |
| WO | WO 2016/149512 A4 | 9/2016 |

OTHER PUBLICATIONS

Donaldson Fuel Filtration Product Brochure. No Date Listed. 78 pages.
International Patent Application No. PCT/US2016/22890, filed Mar. 17, 2016; International Search Report / Written Opinion dated Jun. 9, 2016; 13 pages.
International Patent Application No. PCT/US2016/22901, filed Mar. 17, 2016; International Search Report / Written Opinion dated Aug. 5, 2016; 16 pages.
European Patent Application No. 16765755.0, filed Mar. 17, 2016, Extended European Search Report dated Sep. 5, 2018, 8 pages.
Chinese Patent Application No. 201680015842.1, filed Mar. 17, 2015; Office Action dated Jul. 15, 2019, English language translation included.

\* cited by examiner

HYDROCARBON-IN-WATER PURIFICATION SYSTEM

This application is the § 371 U.S. National Stage of International Application No. PCT/US2016/022901, filed 17 Mar. 2016, which claims the benefit of U.S. Provisional Application No. 62/134,279, filed 17 Mar. 2015, the disclosures of which are incorporated by reference herein in their entireties.

The present disclosure relates to hydrocarbon-in-water purification systems and methods, and particularly those that remove hydrocarbons from water with a high capacity absorber element upstream from a polishing absorber element.

BACKGROUND

Water contamination in fuel is a concern as it affects the performance and operation of engines. Water contamination can cause various problems including fuel filter plugging, fuel starvation, damage of engine components through cavitation and corrosion, and promotion of microbiological growth, for example.

Various devices have been employed to reduce water contamination in fuel. By way of example, coalescing and separating devices have been employed to first cause the emulsified water to coalesce into larger droplets and then remove the enlarged droplets from the fuel stream. A removed or drained hydrocarbon-in-water dispersion or emulsion stream is an output from this water from fuel separator system.

Recent efforts have been focused on reducing air pollution caused by the combustion of hydrocarbon fluids. Diesel fuels have been refined with reduced amounts of sulphur to meet diesel engine emission control regulations. However, these low-sulphur diesel fuels have necessitated the use of other additives. By way of example, surfactants have been added to low-sulphur diesel fuels to maintain sufficient lubricity of the diesel fuel for the engine. Surfactants have also the effect of stabilizing hydrocarbon-in-water emulsions or dispersions as they lower the interfacial tension between water and hydrocarbons.

SUMMARY

The present disclosure relates to hydrocarbon-in-water purification systems and methods, and particularly to those that remove hydrocarbons from water with a high capacity absorber element upstream from a polishing absorber element, among other aspects.

In many embodiments a hydrocarbon-in-water purification system includes a high capacity hydrocarbon absorber stage having a high capacity hydrocarbon absorber material and an inlet configured to receive a hydrocarbon-in-water dispersion from a fuel system. A polishing hydrocarbon absorber stage is in liquid communication and downstream of the high capacity hydrocarbon absorber stage. The polishing hydrocarbon absorber stage includes polishing activated carbon. The high capacity hydrocarbon absorber material has a greater saturation capacity than the polishing activated carbon and the polishing activated carbon has a greater polishing capacity than the high capacity hydrocarbon absorber material.

In further embodiments, an engine fuel and water separation system includes a fuel and water separator system fluidly connected to an engine fuel line and having a water drain outlet. A hydrocarbon-in-water purification system, described herein, is in fluid communication with the water drain outlet.

In still further embodiments, a method includes forming a hydrocarbon-in-water dispersion from a fuel system and passing the hydrocarbon-in-water dispersion through a high capacity hydrocarbon absorber stage. The high capacity hydrocarbon absorber stage includes a high capacity hydrocarbon absorber material that removes at least a portion of hydrocarbon from the dispersion to form a permeate that is substantially water. Then, passing the permeate through a polishing hydrocarbon absorber stage. The polishing hydrocarbon absorber stage includes polishing activated carbon to adsorb hydrocarbon and form a polished water stream. The high capacity hydrocarbon absorber material has a greater saturation capacity than the polishing activated carbon and the polishing activated carbon has a greater polishing capacity than the high capacity hydrocarbon absorber material.

In various embodiments, a method includes determining whether a purification state of a dischargeable water volume in a final purification bed in a water filter is clean or not clean. The water filter contains one or more water volumes and a plurality of purification beds arranged from a first purification bed to the final purification bed such that the first purification bed receives new water introduced into the water filter from a water collection reservoir and the final purification bed discharges water from the water filter. The one or more water volumes reside in the plurality of purification beds. The method further includes introducing a new water volume into the first purification bed in response to determining that the dischargeable water volume is clean. Introducing the new water volume may move each of the one or more water volumes in the water filter such that the dischargeable water volume leaves the final purification bed and a next dischargeable water volume of the one or more water volumes enters the final purification bed. The method also includes tracking a purification state associated with the next dischargeable water volume in response to a residence time of the next dischargeable water volume in at least one of the purification beds, and tracking a bed loading state associated with the at least one of the purification beds in response to the residence time.

In additional embodiments, a method includes introducing a new water volume into a first purification bed of a water filter. The water filter contains one or more water volumes and a plurality of purification beds arranged from the first purification bed to a final purification bed such that the first purification bed receives new water introduced into the water filter from a water collection reservoir and the final purification bed discharges water from the water filter. The one or more water volumes may reside in the plurality of purification beds. The method may further include updating a purification bed tracker defining an associated purification bed corresponding to one of the plurality of purification beds. The purification bed tracker maintains a current residence time of a current water volume residing in the associated purification bed, a current purification state of the current water volume, and a current bed loading state of the associated purification bed. Each of the plurality of purification beds is associated with a different purification bed tracker and a different water volume. Also, the method includes updating the current purification state of the purification bed tracker associated with the first purification bed to unclean.

In various further embodiments, a method includes introducing a new water volume into a first purification bed of a water filter. The water filter contains one or more water volumes and a plurality of purification beds arranged from the first purification bed to a final purification bed such that the first purification bed receives new water introduced into the water filter from a water collection reservoir and the final purification bed discharges water from the water filter. The one or more water volumes reside in the plurality of purification beds. The method further includes updating a water volume tracker defining an associated water volume corresponding to one of the water volumes. The water volume tracker maintains a current residence time of the associated water volume, a current purification state of the associated water volume, a current purification bed in which the associated water volume resides, and a current bed loading state of the current purification bed. Each of the one or more water volumes is associated with a different water volume tracker and a different purification bed. Still further, the method includes creating a water volume tracker associated with the new water volume with the current purification state of the new water volume set to unclean.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The disclosure may be more completely understood in consideration of the following detailed description of various embodiments of the disclosure in connection with the accompanying drawings, in which.

Figure 1:
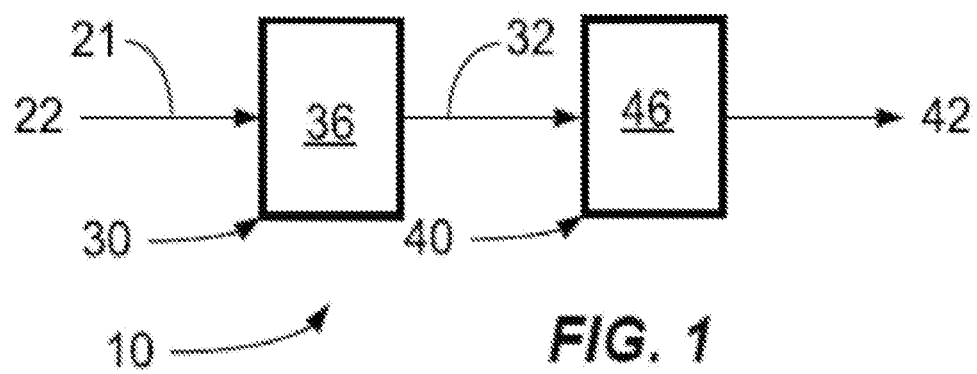
FIG. 1 is a schematic diagram view of a hydrocarbon-in-water purification system.

The schematic drawings presented herein are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Any direction referred to herein, such as "top," "bottom," "left," "right," "upper," "lower," "above," below," and other directions and orientations are described herein for clarity in reference to the figures and are not to be limiting of an actual device or system or use of the device or system. Many of the devices, articles or systems described herein may be used in a number of directions and orientations.

The term "hydrocarbon" refers to oil or fuel materials that are primarily formed of saturated or unsaturated molecules with thirty or less carbon atoms.

The phrase "hydrocarbon-in-water emulsion" refers to an emulsion or dispersion where water is the continuous phase and hydrocarbon is the dispersed or discontinuous phase.

The term "absorption" refers to the removal process of hydrocarbons from water and includes absorption, adsorption, or the like processes of removal of hydrocarbons from water.

The phrases "high capacity hydrocarbon absorber material" and "high capacity material" refer to a material that does not need to clean water to the intended cleanliness, but instead has properties that lead to high saturation capacities. For example, when challenged with 2500 ppm B5-in-water emulsion or dispersion (B5=5% biodiesel blend) the saturation capacity of these materials is preferably greater than 750 mg of hydrocarbon per gram of material or greater than 1000 mg of hydrocarbon per gram of material. Preferred saturation capacities will vary depending on the challenge fluid concentration and makeup.

The phrase "polishing hydrocarbon absorber material" and "polishing material" refer to a material that can purify water down to the intended cleanliness over a wide range of incoming challenge water concentrations. Preferably, these materials have high loading characteristics at the intended target cleanliness. For example, when challenged with 2500 ppm B5-in-water emulsions or dispersions, with a target cleanliness of 2 ppm, these materials have a preferred loading or polishing capacity of greater than 25 mg of hydrocarbons per gram of material or greater than 50 mg of hydrocarbon per gram of material. Preferred loading characteristics depend on challenge fluid concentration and makeup, and on target cleanliness The present disclosure describes water purification systems and particularly to systems that remove hydrocarbons from water with a high capacity absorber element upstream from a polishing absorber element, among other aspects. The high capacity absorber element removed at least a portion of the hydrocarbon from a hydrocarbon in water dispersion to form a permeate. The permeate is then passed through the polishing absorber element to form a polished water stream. The polished water stream can have less than 5 ppm of hydrocarbons or less than 2 ppm or hydrocarbons or less than 1 ppm of hydrocarbons. In many embodiments the high capacity absorber element is activated carbon and/or a polymeric material such as polyurethane and the polishing absorber stage is activated carbon. The high capacity hydrocarbon absorber material has a greater saturation capacity than the polishing activated carbon and the polishing activated carbon has a greater polishing capacity than the high capacity hydrocarbon absorber material. The high capacity hydrocarbon absorber stage and the polishing hydrocarbon absorber stage may be contained within a single housing. While the present disclosure is not so limited, an appreciation of various aspects of the disclosure will be gained through a discussion of the examples provided below.

Fuel cleanliness requirements for fuel injection systems are demanding in order to ensure reliable engine performance. To a large degree, fuel filtration is responsible for meeting the fuel cleanliness requirements associated with the control of abrasive particles and non-dissolved water. These fuel filters can coalesce at least a portion of the entrained water from the fuel stream and form a fuel-in-water dispersion or emulsion waste stream.

Figure 3:
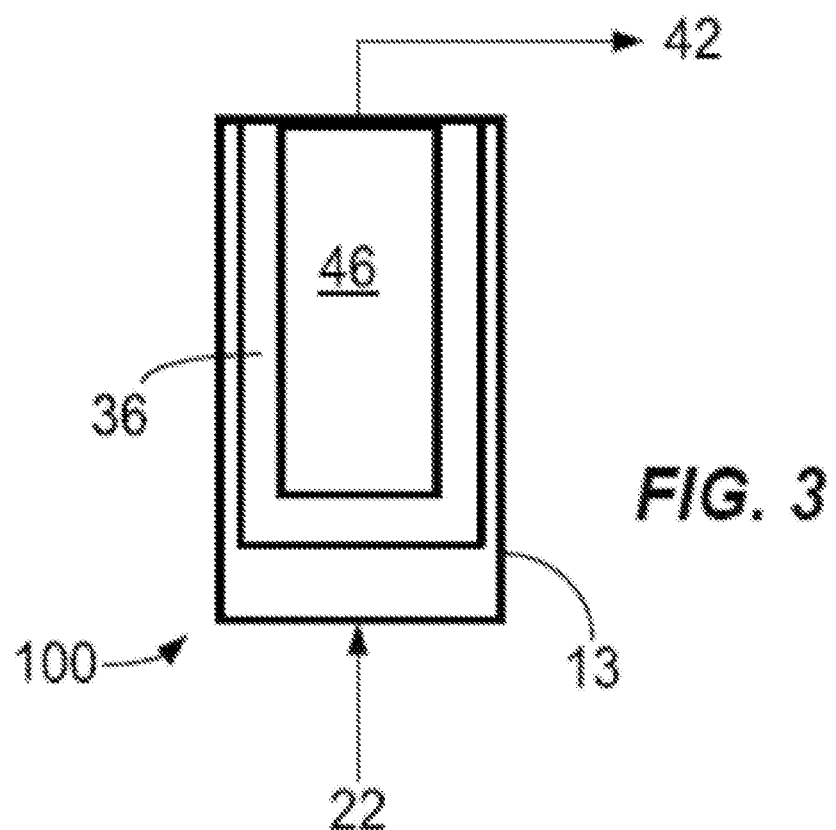
FIG. 3 is a schematic diagram view of another hydrocarbon-in-water purification system.

FIG. 1 is a schematic diagram view of a hydrocarbon-in-water purification system 10. FIG. 3 is a schematic diagram view of another hydrocarbon-in-water purification system 100. The hydrocarbon-in-water purification system 10 includes high capacity hydrocarbon absorber stage 30 containing a high capacity hydrocarbon absorber material 36 and an inlet 21 configured to receive a hydrocarbon-in-water dispersion 22 from a hydrocarbon-in-water dispersion source. The high capacity hydrocarbon absorber material 36 removes at least a portion of the hydrocarbon and forms a permeate that is substantially water. Permeate exits the high capacity hydrocarbon absorber stage 30. A polishing hydrocarbon absorber stage 40 is in liquid communication and downstream of the high capacity hydrocarbon absorber stage 30. Permeate 32 enters the polishing hydrocarbon absorber stage 40 that includes a polishing hydrocarbon absorber material 46. The polishing hydrocarbon absorber material 46 removes the remaining hydrocarbon to achieve a purified water stream 42 exiting the polishing hydrocarbon absorber stage 40. The polishing hydrocarbon absorber stage 40 can include activated carbon, for example.

Preferably, the high capacity hydrocarbon absorber material 36 has a greater saturation capacity ($q_{sat}$) than the polishing activated carbon 46 and the polishing activated carbon 46 has a greater loading or polishing capacity ($q_L$) than the high capacity hydrocarbon absorber material 36. The high capacity hydrocarbon absorber material 36 may have an, at least 10% greater or at least 25% or greater or at least 50% greater or at least 100% greater saturation capacity ($q_{sat}$) than the polishing activated carbon 46. The polishing activated carbon 46 may have an, at least 10% a greater or at least 25% greater loading or greater or at least 50% greater or at least 100% greater polishing capacity ($q_L$) than the high capacity hydrocarbon absorber material 36.

FIG. 3 illustrates an embodiment of a dual absorber 100 where the high capacity hydrocarbon absorber stage material 36 forms a container defining a void space and the polishing hydrocarbon absorber material 46 (for example, activated carbon) is disposed in the void space. The high capacity hydrocarbon absorber stage material 36 forming the container can be contained in a housing 13 having an inlet 22 (supplying the fuel in water dispersion) and an outlet 42 (purified water stream). In many of these embodiments the high capacity hydrocarbon absorber stage material 36 is a non-woven fiber or fabric layer that is formed of a polymeric material described below.

Figure 2:
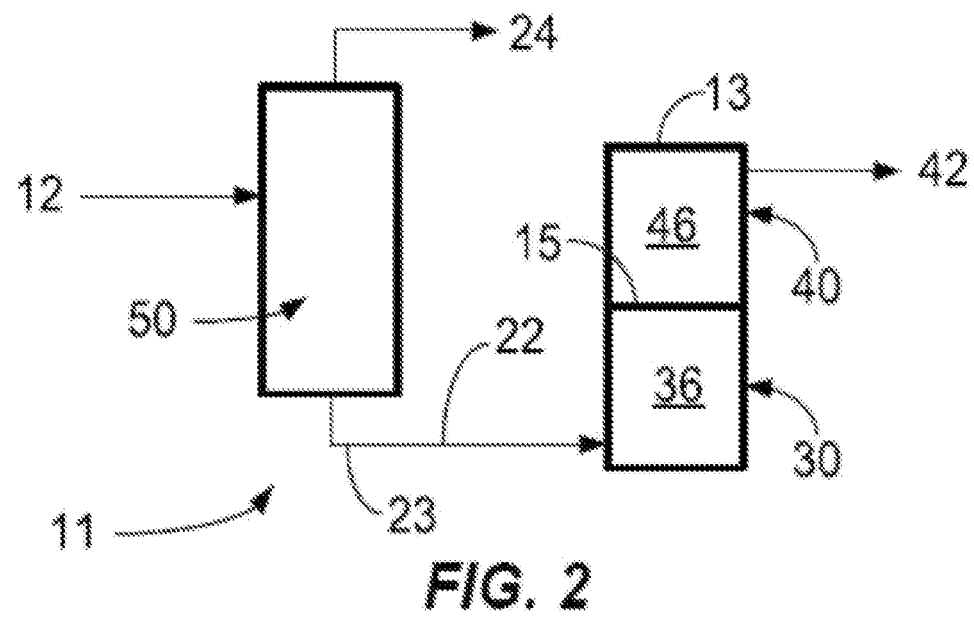
FIG. 2 is a schematic diagram view of an engine fuel and water separation system.

FIG. 2 is a schematic diagram view of an engine fuel and water separation system 11. The engine fuel and water separation system 11 includes a fuel and water separator system 50 (fuel water separator) fluidly connected to an engine fuel line 12 and having a water drain outlet 23 and a filtered fuel outlet 24. A hydrocarbon-in-water purification system 10, 100 is in fluid communication with the water drain outlet 23.

In many embodiments the hydrocarbon-in-water dispersion source is fuel filter element 50 that can filter out particulates from the fuel flow and coalesce water and form a hydrocarbon-in-water dispersion stream. The fuel filter element 50 forms a portion of a fuel system such as those used in a diesel engine such as a vehicle engine, for example.

The hydrocarbon-in-water purification system 10, 100 may be contained within a single housing. The high capacity hydrocarbon absorber stage 30 and the polishing hydrocarbon absorber stage 40 are contained within a single housing 13, a filter housing, for example. The high capacity hydrocarbon absorber stage 30 may defines a first volume 36 (of high capacity material) and the polishing hydrocarbon absorber stage 40 may define a second volume 46 (of polishing material) and the first volume 36 and the second volume 46 are contained within a filter housing 13.

The high capacity hydrocarbon absorber stage 30 and the polishing hydrocarbon absorber stage 40 may be physically separated from each other when contained within a single housing 13. A porous dividing element 15 may separate the first volume 36 from the second volume 46.

The porous dividing element 15 may prevent or reduce mixing or diffusion of the first volume 36 (of high capacity material) with the second volume 46 (of polishing material). The porous dividing element 15 may be fixed to the filter housing 13. The porous dividing element 15 may include a plurality of apertures. The apertures may be sized to prevent the high capacity material and the polishing material from passing through the porous dividing element 15. The apertures may be smaller than the particle size of the high capacity material and the polishing material. The porous dividing element 15 may be a screen element or porous metal layer.

The porous dividing element 15 may be a porous non-woven layer or non-woven fabric layer. The non-woven layer 15 may be formed of a polymeric material such as polyethylene, polypropylene, polyurethane, polyester, and combinations thereof. These polymeric materials may also absorb hydrocarbons and be a hydrocarbon absorber material. The porous dividing element 15 may be a polyurethane non-woven layer. The porous dividing element 15 may be an extruded layer such as a polymeric screen formed of a polymeric material such as polyethylene, polypropylene, polyurethane, polyester, and combinations thereof. These polymeric materials may also absorb hydrocarbons and be a hydrocarbon absorber material.

The hydrocarbon-in-water purification system 10, 100 includes a high capacity hydrocarbon absorber stage 30 containing a high capacity hydrocarbon absorber material 36 and an inlet 23 (fluidly coupled to the water drain outlet 23 of the fuel and water separator system 50) to receive a hydrocarbon-in-water dispersion 22 from a hydrocarbon-in-water dispersion source 50. The high capacity hydrocarbon absorber material 36 removes at least a portion of the hydrocarbon and forms a permeate that is substantially water. Permeate exits the high capacity hydrocarbon absorber stage 30. A polishing hydrocarbon absorber stage 40 is in liquid communication and downstream of the high capacity hydrocarbon absorber stage 30. Permeate enters the polishing hydrocarbon absorber stage 40 that includes a polishing hydrocarbon absorber material 46. The polishing hydrocarbon absorber material 46 removes the remaining hydrocarbon to achieve a purified water stream 42 exiting the polishing hydrocarbon absorber stage 40. The polishing hydrocarbon absorber stage 40 can include activated carbon, for example.

In some embodiments, the hydrocarbon-in-water purification system 10, 100 can include an antimicrobial agent. For example, one or more of the high capacity hydrocarbon absorber stage 30 or polishing hydrocarbon absorber stage 40 can include an antimicrobial agent. The antimicrobial agent can be any useful material or compound that inhibits microbe growth or kills microbes. Exemplary antimicrobial agents include silver, copper, organic biocides (such as quaternary amines, for example), ozone, or UV light.

In many embodiments, the hydrocarbon-in-water dispersion or emulsion has a hydrocarbon content of at least 500 ppm or at least 1000 ppm or at least 2,000 ppm or at least 5,000 ppm. The permeate has a hydrocarbon content of less than 500 ppm or less and 250 ppm or less than 100 ppm. The polished water stream has a hydrocarbon content of less than 5 ppm or less than 2 ppm, or less than 1 ppm.

In other embodiments, the hydrocarbon-in-water dispersion or emulsion has a hydrocarbon content of at least 100 ppm or at least 250 ppm or is in a range from 100 ppm to 500 ppm. The permeate has a hydrocarbon content of less than the hydrocarbon-in-water dispersion or emulsion. The polished water stream has a hydrocarbon content of less than 5 ppm or less than 2 ppm, or less than 1 ppm.

Hydrocarbon Absorbing Material

The hydrocarbon absorbing material includes any material capable of absorbing hydrocarbons. Exemplary hydrocarbon absorbing material includes polymeric material, activated carbon, or both. The hydrocarbon-in-water dispersion first contacts a high capacity hydrocarbon absorbing material prior to contacting a polishing hydrocarbon absorbing material. It has been found that the overall life of the hydrocarbon absorbing element can be prolonged by having the high capacity hydrocarbon absorbing material upstream of the polishing hydrocarbon absorbing material.

The relationship between equilibrium concentration and carbon loading can be described by an adsorption isotherm. Three of the most widely used models of adsorption are the Freundlich, Langmuir, and BET (Brunauer, Emmett, and Teller) isotherms. Of these, the empirical Freundlich Isotherm expression best describes the loading behavior of activated carbon over a wide range of challenge conditions and loading amounts. The Freundlich isotherm expression is:

$$q = \frac{x}{m} = K_f c_e^{\frac{1}{n}}$$

where q is the adsorbent loading in milli-grams of adsorbate per gram of adsorbent (x/m), $c_e$ is the equilibrium adsorbate concentration in solution, and $K_f$ and 1/n are the isotherm parameters that are dependent on the adsorbate, adsorbent, and temperature.

The Freundlich Isotherm expression can be used to determine the adsorbent loading at a particular target equilibrium adsorbate concentration. When the equilibrium adsorbate concentration ($c_e$) is equal to the incoming adsorbate concentration ($c_o$) the material is exhausted. The loading capacity under these conditions is called the saturation capacity or $q_{sat}$. The saturation capacity of a material varies with different incoming adsorbate concentrations. A material that has high saturation capacity is called a high capacity hydrocarbon absorber material or high capacity material.

In most purification applications the target adsorbate concentration leaving the element ($c_t$) is less than the incoming adsorbate concentration. In this case, the adsorbent loading determined from the Freundlich Isotherm expression at the intended target adsorbate concentration is deemed the polishing capacity or $q_t$. The polishing capacity of a material varies with different incoming adsorbate concentrations and target adsorbate concentrations. The polishing capacity is generally less than the saturation capacity. A material that has high polishing capacity is called a polishing hydrocarbon absorber material or polishing material.

Preferably, the high capacity hydrocarbon absorber material has a greater saturation capacity ($q_{sat}$) than the polishing hydrocarbon absorber material and the polishing hydrocarbon absorber material has a greater polishing capacity ($q_t$) than the high capacity hydrocarbon absorber material. The saturation capacity ($q_{sat}$) and polishing capacity ($q_t$) is determined with the same incoming adsorbate concentration.

A hydrocarbon-in-water purification system containing separate sections of a high capacity material followed by a polishing material has an increased lifetime over a similar sized system of a single material. In particular, a filter housing containing separate sections of a high capacity material followed by a polishing material can have an increased lifetime over a similar sized filter housing of a single material. The high capacity material and the polishing material are configured in serial flow orientation to each other where the polishing material is downstream from the high capacity material.

Activated carbon is a fine-grained carbon with an extremely large surface area and a highly porous structure. Its adsorption capacity is therefore especially high and is especially pronounced for hydrocarbons in particular. Activated carbon consists primarily of carbon (mostly >90%) with a strongly porous structure. In addition, the internal surface area of the activated carbon is between 500 and 2000 $m^2$/g carbon, which explains the high adsorption capacity of the activated carbon.

A "high capacity" activated carbon is a material that has a loading at saturation ($q_{sat}$) of at least 25% or at least 50% or at least 75% greater than a control sample of activated carbon (referred to herein as polishing hydrocarbon absorbing material). Generally, the high capacity hydrocarbon absorber material has a greater saturation capacity ($q_{sat}$) than the polishing hydrocarbon absorber material.

In some embodiments the high capacity hydrocarbon absorbing polymeric material includes hydrocarbon absorbing polymeric polyethylene, polypropylene, polyurethane, polyester, and combinations thereof. These absorbing polymeric materials can be in the form of a non-woven fabric layer, nanofiber layer, a sponge or polymer foam element or layer. In other embodiments the high capacity hydrocarbon absorbing material is an activated carbon. In some embodiments, the high capacity hydrocarbon absorbing material includes both a high capacity hydrocarbon absorbing polymeric material and a high capacity hydrocarbon absorbing activated carbon material.

The high capacity hydrocarbon absorbing material includes one or more or two or more different types or kinds of high capacity hydrocarbon absorbing material. The two or more high capacity hydrocarbon absorbing materials may be mixed together within a single volume or separated from each other by a divider or spacer element where they are in serial flow orientation to each other.

In some embodiments the high capacity hydrocarbon absorbing material includes two or more high capacity hydrocarbon absorbing activated carbon materials. The two or more high capacity hydrocarbon absorbing activated carbon material may be mixed together within a single volume or separated from each other by a divider or spacer element where they are in serial flow orientation to each other.

In some embodiments the high capacity hydrocarbon absorbing material includes two or more high capacity hydrocarbon absorbing polymeric materials. The two or more high capacity hydrocarbon absorbing polymeric materials may be mixed together within a single volume or separated from each other by a divider or spacer element where they are in serial flow orientation to each other.

In some embodiments the high capacity hydrocarbon absorbing material includes a high capacity hydrocarbon absorbing polymeric material and a high capacity hydrocarbon absorbing activated carbon material. The high capacity hydrocarbon absorbing polymeric material and the high capacity hydrocarbon absorbing activated carbon material may be mixed together within a single volume or separated from each other by a divider or spacer element where they are in serial flow orientation to each other. In these embodiments, the high capacity hydrocarbon absorbing polymeric material may represent from 10 to 90 wt % of the total high capacity hydrocarbon absorbing material and a high capacity hydrocarbon absorbing activated carbon material may represent from 90 to 10% of the total high capacity hydrocarbon absorbing material. The high capacity hydrocarbon absorbing polymeric material may represent from 25 to 50 wt % of the total high capacity hydrocarbon absorbing material and a high capacity hydrocarbon absorbing activated carbon material may represent from 75 to 50% of the total high capacity hydrocarbon absorbing material. The high capacity hydrocarbon absorbing polymeric material may represent from 75 to 50 wt % of the total high capacity hydrocarbon absorbing material and a high capacity hydrocarbon absorbing activated carbon material may represent from 25 to 50% of the total high capacity hydrocarbon absorbing material.

In many embodiments the polishing hydrocarbon absorber material is an activated carbon. In some embodiments the polishing hydrocarbon absorbing material includes two or more polishing hydrocarbon absorbing activated carbon materials. The two or more polishing hydrocarbon absorbing activated carbon material may be mixed together within a single volume or separated from each other by a divider or spacer element where they are in serial flow orientation to each other.

It is understood that the high capacity hydrocarbon absorbing material and the polishing hydrocarbon absorber material are different materials. For example both the hydrocarbon absorbing material and the hydrocarbon absorber material can be activated carbon, however, they are different types of activated carbon that have different absorption properties. Generally, the polishing activated carbon has a greater loading or polishing capacity ($q_L$) than the high capacity hydrocarbon absorber material.

In some embodiments the hydrocarbon-in-water purification system has about an equal weight or volume amount of high capacity hydrocarbon absorber material as compared to polishing hydrocarbon absorber material. The high capacity hydrocarbon absorber material represents from 45 to 55 wt % of the total absorber material (contained within the hydrocarbon-in-water purification system) and the polishing hydrocarbon absorber material is about 55% to 45% of the total absorber material.

In some embodiments having a greater wt % of high capacity hydrocarbon absorber material as compared to polishing hydrocarbon absorber material has been shown to improve the lifetime of the overall hydrocarbon in water purification system. In some of these embodiments the high capacity hydrocarbon absorber material represents from 55% to 95% wt of the total absorber material and the polishing hydrocarbon absorber material is about 45% to 5% of the total absorber material.

In other embodiments having a greater wt % of polishing hydrocarbon absorber material as compared to high capacity hydrocarbon absorber material has been shown to improve the lifetime of the overall hydrocarbon in water purification system. In some of these embodiments the high capacity hydrocarbon absorber material represents from 15% to 45% wt of the total absorber material and the polishing hydrocarbon absorber material is about 85% to 55% wt of the total absorber material.

In some embodiments the hydrocarbon-in-water purification system has about ⅔ high capacity hydrocarbon absorber material and ⅓ polishing hydrocarbon absorber material. The high capacity hydrocarbon absorber material represents from 60 to 75 wt % of the total absorber material (contained within the hydrocarbon-in-water purification system) and the polishing hydrocarbon absorber material is about 40% to 25% of the total absorber material.

As used herein, terms such as "inside", "outside", "vertical", "horizontal", "above", "below", "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device.

Figure 4:
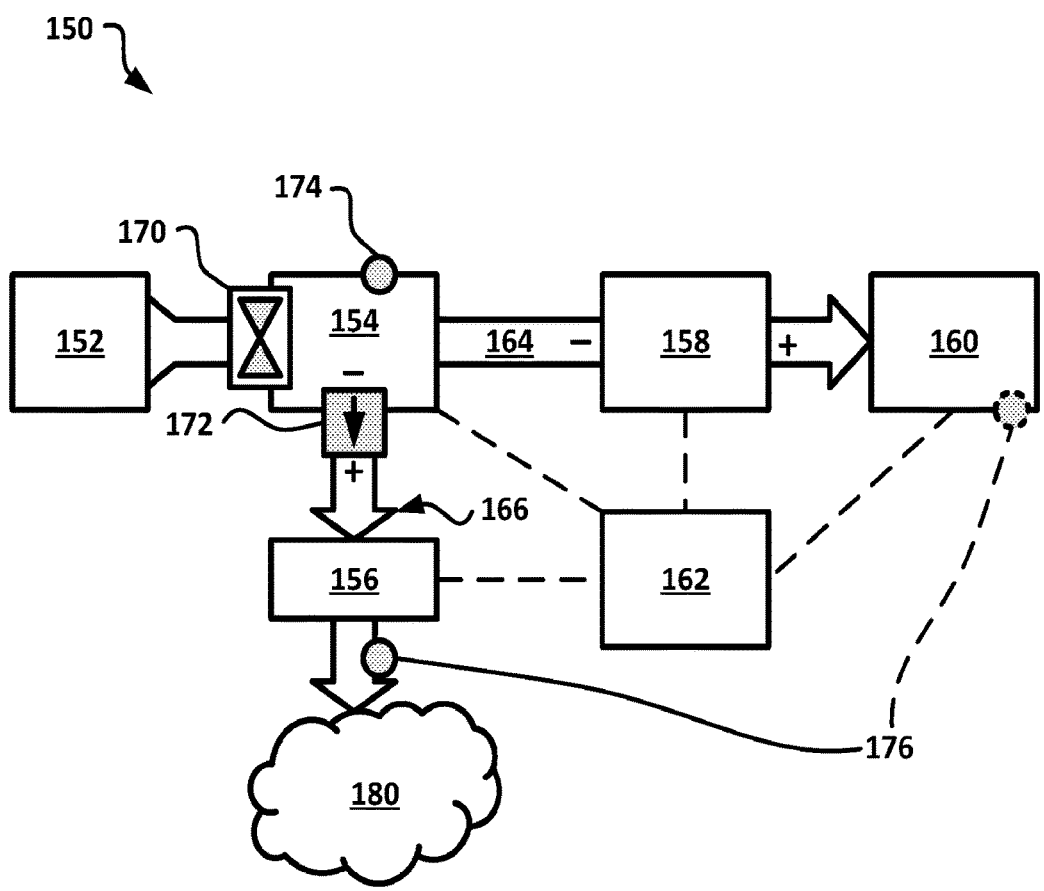
FIG. 4 is a schematic diagram view of an engine system having a hydrocarbon-in-water purification system.

FIG. 4 is a schematic diagram view of an engine system 150 showing various components that can be used to provide and control fluid flow from a source of fuel having a potential need for fuel water separation. As shown, the engine system 150 includes a fuel source 152, fuel water separator 154, a water filter 156, a fuel pump 158, an engine 160, a controller 162, a fuel line 164, and a water line 166. A fuel line valve 170, a water line valve 172, a water-in-fuel (WIF) sensor 174, a temperature sensor 176, are also included in this illustrated embodiment of the engine system 150.

Although these components are included in the illustrated embodiment, it should be understood that the disclosure is not limited to including each component shown, and furthermore, other components may be included that are not shown or may be found in other arrangements that may also be used with control techniques described herein for separating water from fuel and purifying the separated water to remove hydrocarbons. For example, the engine system 150 may also be configured as described in European Patent Application 2,878,352, filed 29 Nov. 2013, and titled "Fuel Filter Assembly, Filter Element and Method for Draining Water from a Fuel Filter Assembly," which is incorporated herein for all purposes.

During operation, the engine system 150 may separate water from fuel. Water may be present in the fuel, for example, due to atmospheric condensation or non-ideal fuel management. In some cases, fuel in the fuel source 152 may be mixed with water. The engine system 150 preferably removes water from the fuel before it reaches the engine 160.

The water in the engine system 150 may not be useful, however, and in various embodiments, the water is preferably evacuated out of the engine system 150, which may enter into the environment 180. In at least one embodiment, water may evaporate into the environment 180.

The separated water may be unclean, however. As used herein, "unclean water" means water that may contain or is considered to contain contaminants, such as hydrocarbons. Accordingly, "clean water" means water that does not have contaminants or is considered to be sufficiently free of contaminants. Preventing the release of unclean water into the environment 180 may be preferable, for example, to comply with jurisdictional requirements. In various embodiments, a threshold level of contaminants may be determined in response to jurisdictional requirements. In many cases, "unclean water" is preferably purified into "clean water" that may enter into the environment 180 in compliance with jurisdictional requirements.

In various illustrative embodiments, the engine system 150 preferably purifies the unclean water separated before leaving the engine system 150. The various components of the engine system 150 and their operations related to purifying unclean water are described herein in further detail.

The fuel source 152 may be a fuel tank capable of containing and providing a fuel to the engine 160 through fuel line 164. The engine 160 may be an internal combustion engine, for example, which combusts the fuel (for example, diesel) to provide mechanical energy (for example, torque for automotive power) during normal operation. During normal operation of the engine 160, the fuel line 164 is typically in fluid communication with the fuel source 152, the fuel water separator 174, the fuel pump 158, and the engine 160.

Fluid communication along the fuel line 164 may be interrupted by the fuel line valve 170, which can be open or closed. A closed fuel line valve 170 preferably prevents fluid communication across the valve in either direction. In at least the illustrated embodiment, the fuel line valve 170 is positioned between the fuel source 152 and the fuel water separator 154 along the fuel line 164. During normal operation of the engine 160, the fuel line valve 170 is preferably open.

Fuel is preferably drawn by the fuel pump 158 upstream or downstream along the fuel line 164. As used herein to describe the engine system 150, the term "upstream" along the fuel line 164 means a direction toward the fuel source 152. Accordingly, the opposite term "downstream" along the fuel line 164 means a direction toward the engine 160.

The fuel pump 158 may provide a pressure differential along the fuel line 164. During normal operation, the fuel pump 158 provides a relatively higher pressure downstream (+) and a relatively lower pressure upstream (−) to draw fuel downstream.

In some embodiments, the fuel pump 158 may operate in reverse. For example, the fuel pump 158 may provide a relatively lower pressure upstream and a relatively higher pressure upstream to draw fuel upstream.

The fuel water separator 154 preferably removes a sufficient amount of water from the fuel to prevent or mitigate harm to the engine 160. As shown, the fuel water separator 154 is positioned downstream of the fuel source 152 and upstream of the fuel pump 158 and the engine 160.

In many embodiments, the fuel water separator 154 is similar to fuel filter element 50 in FIG. 2. In various illustrative embodiments, the fuel water separator 154 receives fuel mixed with water in an upstream inlet, filters water from the fuel, provides the filtered fuel to a downstream outlet to the fuel line 164, and provides water to the water line 166.

The water line 166 may provide fluid communication between the environment 180 and the fuel water separator 154. In the illustrated embodiment, the water line 166 typically provides fluid communication among the fuel water separator 154, the water filter 156, and the environment 180. As shown, the water filter 156 is positioned downstream of the fuel water separator 154 and upstream of the environment 180.

As used herein, "upstream" along the water line 166 means a direction toward to the fuel water separator 154. Accordingly, the opposite term "downstream" along the water line 166 means a direction toward the environment 180.

In many embodiments, the water provided from the fuel water separator 154 to the water line 166 is considered unclean water and may include a hydrocarbon-in-water dispersion. Unclean water is preferably purified by the water filter 156 to provide clean water to the environment 180. For example, the water filter 156 may include the hydrocarbon-in-water purification system 10, 100 of FIG. 1 or 3, which absorbs hydrocarbons into a hydrocarbon absorbing material to purify water.

Fluid communication along the water line 166 may be restricted by the water line valve 172, which may allow fluid to flow in only one direction along the water line 166. For example, the water line valve 172 may be a check valve, which may be pressure sensitive to open and allow flow in one direction and to close and prevent fluid flow in the other direction. In at least one embodiment, the water line valve 172 is a passive check valve. In the illustrated embodiment, the water line valve 172 is positioned along the water line 166 between the fuel water separator 154 and the water filter 156.

During normal operation, the fuel pump 158 may create a lower upstream pressure than the pressure of the environment 180 (for example, atmospheric pressure), which may cause a pressure differential across the water line valve 172 that is lower upstream (−) and higher downstream (+) along the water line 166. In the illustrated embodiment, the water line valve 172 tends to close in response this pressure differential and prevents fluid from flowing upstream along the water line 166.

Water is preferably evacuated from the engine system 150 by flowing water downstream through water line valve 172. The separated water may flow from the fuel water separator 154, through to the water filter 156, and out of the engine system 150, in some embodiments, via a pressure differential. For example, water may be evacuated by building a sufficient pressure differential builds across the water line valve 172, particularly a higher pressure upstream than downstream, to open it and allow water to flow downstream along the water line 166 to evacuate water. In many embodiments, the water line valve 172 preferably allows fluid to flow only downstream along the water line 166.

In the illustrated embodiment, the fuel pump 158 may be used to provide the pressure differential needed to evacuate water. For example, the fuel pump 158 can operate in reverse to create a higher upstream pressure than the pressure of the environment 180, which is sufficient to open the water line valve 172. In particular, the fuel line valve 170 may also be closed to facilitate the build-up of pressure in the fuel water separator 154, for example, by preventing fuel pumped upstream from flowing back into the fuel source 152. Once opened due to a sufficient pressure differential, the open water line valve 172 allows fluid to flow downstream along the water line 166 across the pressure differential toward the environment 180.

In many embodiments, the engine 160 is preferably not operating (for example, not consuming fuel) while the fuel pump 158 is reversed. Accordingly, the engine 160 may preferably be turned off before evacuating water. In other embodiments, however, another component other than the fuel pump 158 may be used to provide pressure to evacuate water, or a different valve other than a check valve, such as an active one-way valve that is not necessarily responsive to pressure in the fuel line 164, may be used to allow water to flow downstream for evacuation.

In various embodiments, the unclean water (for example, hydrocarbon-in-water dispersion) may be described as being separated in a continuous manner by the fuel water separator 154 as fuel flows through it. When an engine 160 is running, an amount of water separated may be modeled and estimated in response to one or more parameters. Non-limiting examples of water separation parameters include: the type of filter material in the fuel water separator 154, the "saturation" of such filter material (for example, the amount of filter loading), the concentration of water in the fuel, the temperature of the fuel, and the flow rate of fuel, among others.

While the engine 160 is running, however, the fuel pump 158 is preferably in normal operation and water is not being evacuated. It may be beneficial to collect and store the water until it can be evacuated. Accordingly, the unclean water may be described as being evacuated from the fuel water separator 154 in batches. The process of continuously separating water and evacuating it in batches may be described as a "multi-batch" process. In some illustrative embodiments, the fuel water separator 154 includes a reservoir for collecting the unclean water until it is evacuated into the water filter 156.

In many illustrative embodiments, the unclean water preferably is purified while residing in the water filter 156. A required or minimum amount of time in the water filter 156 to sufficiently purify the unclean water for evacuation from the engine system 150 may be modeled or estimated in response to one or more parameters. For example, the water purification parameters may include the kinetic parameters, such as adsorbent loading, ratio of adsorbate to adsorbent, equilibrium adsorbate concentration, adsorbate characteristics, adsorbent characteristics (for example, physical characteristics such as surface area), and temperature. In many embodiments, a kinetic profile based on a particular set of kinetic parameters that models the concentration of hydrocarbons in water versus the amount time in the water filter 156 may be used to determine a residence time threshold, as well as other aspects of the control technique, as described herein elsewhere.

In many embodiments, it may be preferable to maximize or optimize the amount of time unclean water spends in the water filter 156, which may be evacuated in batches out of the fuel water separator 154 and into the water filter 156. On the other hand, it may also be preferable to minimize or optimize the frequency that the engine system 150 is turned off for evacuating water from the fuel water separator 154 (in other words, minimizing the interruption of operating time). The technique described herein defines a technique for optimizing the purification and the evacuation of water that may be used with engine system 150.

In many illustrative embodiments, the engine system 150 evacuates a predetermined water volume from the fuel water separator 154 and into the water filter 156. The water filter 156 is preferably designed for receiving and storing a target number of predetermined water volumes (for example, one, two, three, or more). The target number of predetermined water volumes may be selected to facilitate enough residence time of the water in the water filter 156 based on an estimated water separation rate in the fuel water separator 154 according to a particular application.

In one illustrative automotive application, for example, the estimated rate of water separation by the fuel water separator 154 may be determined to be about 40 mL per hour of engine operation under typical conditions. In the same engine system 150, the estimated rate of water purification by the water filter 156 may be determined to be about 40 mL per hour of residence time under typical conditions. Furthermore, the predetermined water volume for evacuation may be about 40 mL by design, which means three water volumes would be evacuated over a 3 hour period (for example, entering into the water filter at the 0, 1, and 2 hour marks). To facilitate the desired residence time in the water filter 156 for all three water volumes, the water filter 156 may be designed to store multiple predetermined water volumes (for example, at least three). By the time of a fourth evacuation at the 3 hour mark, the first water volume will have at least 3 hours of residence time in the water filter 156 and may be considered to be clean for evacuation out of the water filter 156.

The water filter 156 may be designed to receive and evacuate the predetermined water volumes according to a first-in, first-out process (FIFO). A FIFO process preferably maximizes the amount of time a water volume resides in a water filter 156 capable of containing multiple water volumes by evacuating water that has spent the most time in the water filter 156 from the engine system 150. In the illustrative automotive application described, for example, the first 40 mL water volume evacuated into the water filter 156 at the 0 hour mark may reside in the water filter 156 for 3 hours and be evacuated from the water filter 156 before the second and third water volumes (for example, at the 3 hour mark when a fourth water volume is evacuated into the water filter 156).

The engine system 150 may include a control system for managing the flow of fuel and water through the water filter 156. In the illustrated embodiment, the control system includes the controller 162 in operative communication with various components in the engine system 150 to manage and control, in particular, the evacuation of water. In many illustrative embodiments, the controller 162 also tracks the residence time of unclean water in the water filter 156 to facilitate the management of water evacuation. The controller 162 may be configured to implement various illustrative methods to manage and control water evacuation described herein elsewhere.

Many aspects of this disclosure are described in terms of receivers, timers, managers, operators, or controllers that include sequences of actions to be performed by components of a control and/or a communication system, which can be a computer system or other hardware capable of executing programmed instructions. These components can be embodied in a controller of an engine system (for example, an engine control module/unit (ECM/ECU)), multiple controllers, or a controller separate from the engine system communicating with the engine controller. In at least one embodiment, depicted and described components can be part of a wired or wireless network, such as a controller area network (CAN), in which the controller, sensor, actuators communicate via digital messages. It will be recognized that in embodiments consistent with the present disclosure, each of the various actions could be performed by specialized circuits (for example, discrete logic gates interconnected to perform a specialized function), by program instructions being executed by one or more processors (for example, a central processing unit (CPU) or microprocessor), or by a combination, all of which can be implemented in the controller 162 and/or another controller(s). A controller may utilize a processor or share a processor with another component to perform actions required. Logic of embodiments consistent with the disclosure can be implemented in any suitable data processor, which may be configured to execute instructions on a computer readable medium. A computer readable medium may include tangible forms of media, for example, a random access memory (RAM), a read-only memory (ROM), an erasable programmable read-only memory (for example, EPROM, EEPROM, or Flash memory), an optical fiber, and a portable compact disc read-only memory (CD-ROM), or any other solid-state, magnetic, and/or optical disk medium capable of storing information. Thus, various aspects can be embodied in many different forms, and all such forms are contemplated to be consistent with this disclosure.

The controller 162 may be in operative communication with the fuel line valve 170 and the fuel pump 158. In many illustrative embodiments, the controller 162 provides signals to command the fuel pump 158 to operate normally and to operate in reverse. Further, the controller 162 may provide signals to command the fuel line valve 170 to open or to close. In this manner, the controller 162 is configured to control the evacuation of water.

Also, the controller 162 may be in operative communication with sensors to receive sensor data. In some illustrative embodiments, the controller 162 is operatively coupled to the WIF sensor 174 and the temperature sensor 176 to receive various sensor signals representing sensor data. The controller 162 may use sensor data may to facilitate the management of water evacuation.

The WIF sensor 174 preferably provides a signal indicating that the predetermined water volume is ready to evacuate from the fuel water separator 154. In various illustrative embodiments, the WIF sensor 174 may be in fluid communication with the water collection reservoir of the fuel water separator 154 and positioned to be triggered when the water level (for example, fuel-water interface) in the reservoir meets or exceeds a predetermined trigger volume.

In many embodiments, the predetermined trigger volume is preferably related to the predetermined water volume by a safety factor to prevent separated fuel from flowing into the water filter 156. For example, the WIF sensor 174 position may trigger when at least 50 mL of water has been collected in the fuel water separator 154 and only 40 mL of water may be evacuated into the water filter 156.

In various embodiments, one WIF sensor 174 is included. However, two or more WIF sensors 174 may be included in various embodiments.

In some illustrative embodiments, the controller 162 controls evacuation by commanding the fuel pump 158 to reverse for a predetermined amount of time in response to the WIF sensor 174 being triggered (for example, and the engine 160 being off). In at least one embodiment, the controller 162 reverses the fuel pump 158 for a predetermined amount of time estimated to evacuate the predetermined amount of water under typical operating conditions.

The temperature sensor 176 preferably provides a signal indicating a temperature along the water line. The water temperature may affect the ability of the water to be evacuated from the engine system 150. For example, the temperature sensor 176 may provide a low-temperature signal indicating a possible build-up of ice that may restrict the flow of water. The water temperature may also affect the kinetics of the water filter 156, or its capacity to filter hydrocarbons from water. In response to receiving the low-temperature signal, the controller 162 may update a fault state to indicate that water should not be evacuated until a later time, for example, to facilitate water evacuation management.

The temperature sensor 176 may be dedicated for indicating water temperature or may be a temperature sensor typically present in the engine system 150 for indicating other temperatures. In many illustrative embodiments, the water line 166 is positioned in close proximity to the engine 160 such that the temperature of the water in the water line 166 is within 5 degrees Celsius of the engine 160. In such embodiments, a dedicated sensor for water temperature may not be needed. For example, the temperature sensor 176 may be the engine block sensor, which may already be used to provide the engine block temperature, for example, to an ECU. In such cases, the controller 176 may receive the signal indicating the temperature along the water line from the ECU. This configuration has the further benefit of normalizing the temperature of the water line 166 to about the engine block temperature, which may prevent freezing and ice-buildup when warmed up.

Figure 5:
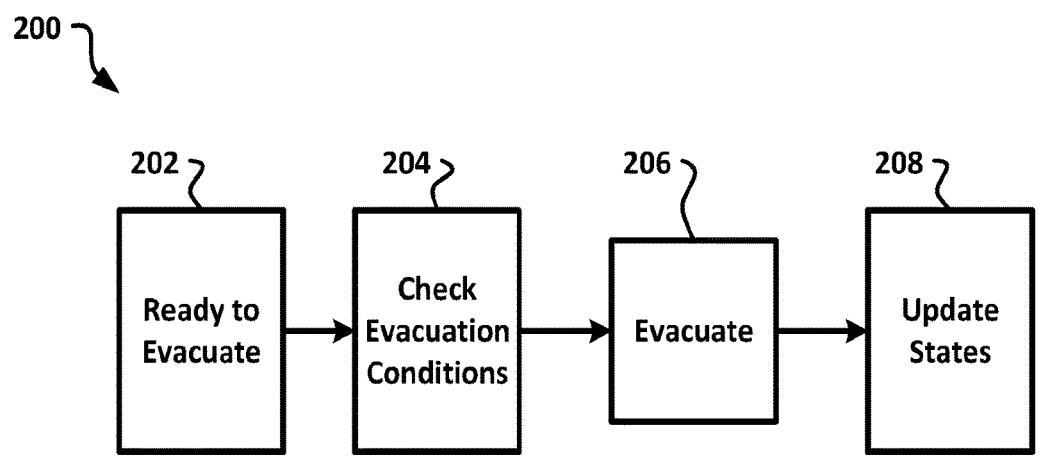
FIG. 5 is a schematic diagram view of a process for managing the evacuation of water from the engine system of FIG. 4.

Referring now to FIGS. 4 and 5 together, a schematic diagram view of an illustrative process 200 for managing the evacuation of water is shown. The process 200 may be implemented in controller 162, for example.

In step 202, an indication that water is ready to evacuate is determined. The indication may be determined in response to a WIF sensor 172 being triggered indicating a predetermined water volume is ready to evacuate from the fuel water separator 154. In such embodiments, the engine system 150 operator may also be notified (for example, by light lamp in instrument cluster) that the WIF sensor 172 has been triggered.

In step 204, water evacuation conditions are checked. In various embodiments, an engine operation state is checked. For example, if the engine key is in the "off" position, the engine 160 is determined to be not operating (for example, in an off state and not running). In some illustrative embodiments, the water evacuation conditions are checked in response to the engine key being turned to the "off" position.

On the other hand, if the engine key is in the "on" position, indicating that the engine 160 is operating, a timer may be started. After a predetermined duration, the timer may expire indicating that the WIF sensor 174 has been triggered for the predetermined duration. The predetermined duration may correspond to an estimated amount of water separated by the fuel water separator 154 over the predetermined duration that exceeds the size of the water collection reservoir and/or exceeds the capacity of the water filter 156 to purify within a particular time limit.

The operator of the engine system 150 may be notified that water must be evacuated within a particular period of time, and a second timer may be started. Upon expiration of the second timer, the engine system 150 may take severe measures to preserve the ability of the water filter 156 to sufficiently purify the water until the operator turns off the engine 160 (for example, pulls over) so that water can be evacuated. Non-limiting examples of severe measures include: derating the engine output, flashing the instrument lamp, and activating an audible alarm.

In further embodiments, a water temperature is checked prior to evacuation. If the water temperature is determined to be below a threshold level, then water may not be evacuated to the potential of freezing water. For example, if the temperature sensor 176 indicates a low water temperature (for example, less than 10 degrees Celsius), the water may not be evacuated.

In additional embodiments, the purification progress of the water volume to be evacuated from the water filter 156 is checked. If the water volume to be evacuated is determined to be not clean, then the water may not be evacuated from the water filter 156. The purification of the water volume is preferably tracked from the entry of the water volume into the water filter 156 until the water volume is evacuated from the water filter 156 to facilitate this determination.

In step 206, water is evacuated from the fuel water separator 154 into the water filter 156 if the evacuation conditions are satisfactory. If the water filter 156 is filled with water before the evacuation, an older water volume may be evacuated from the water filter 156.

In step 208, parameters indicating the state of the filter are updated. For example, fault states may be determined and set. Non-limiting examples of fault states include a low temperature fault, an excess restriction fault, a valve failure fault, an excess water fault, and a filter expired fault. The fault states preferably indicate that the evacuation attempt failed and that water was not evacuated. The absence of any fault states indicates that the evacuation was successful. The engine operator may be notified accordingly.

In one example, a low temperature fault may be determined and set in response to a low temperature signal from the temperature sensor 176, which may impact the ability to evacuate water due to freezing water. In a second example, an excess restriction fault may be determined and set in response to an excessive variation in fuel pump characteristics during reverse operation (for example, during evacuation), which may impact the ability to evacuate water due to a potential restricted flow. In a third example, a valve failure fault may be determined and set in response to an excessive variation in fuel pump characteristics during operation in reverse (for example, during evacuation, the fuel line valve 170 not being closed or water line valve 172 not opening), which may impact the ability to evacuate water due to the undesirable loss of pressure or build-up of pressure. In a fourth example, an excess water fault may be determined and set in response to water collected by the fuel water separator 154 exceeding the capability of the water filter 156 to purify within a particular time limit, which may result in undesirable evacuation of unclean water. In a fifth example, a filter expired fault may be determined and set in response to the water filter 156 or a purification bed 300 reaching the end of a useful service life, which may result in insufficient purification of unclean water despite residence time. In at least one embodiment, the filter expired fault is determined in response to the final purification bed 300 reaching the end of its useful service life (for example, its bed loading threshold).

Figure 6:
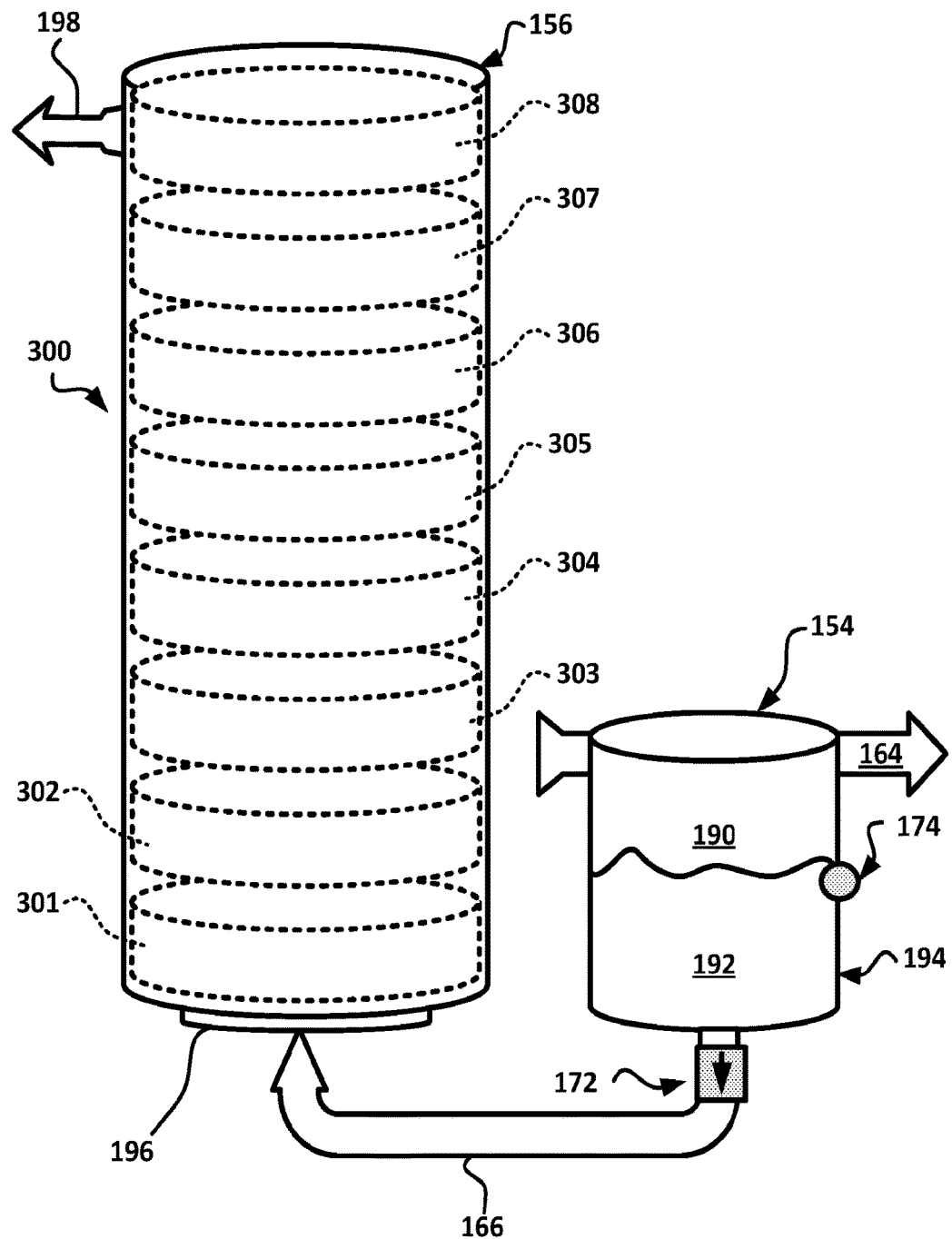
FIG. 6 is a schematic diagram view of a fuel water separator and a water filter of the engine system of FIG. 4.

FIG. 6 is a schematic diagram view of the illustrative fuel water separator 154 and the illustrative water filter 156. In the illustrated embodiment, the fuel water separator 154 removes water 192 from the fuel 190. The separated fuel 190 may continue downstream in normal operation. The separated water 192 may collect in a water collection reservoir 194, preferably at the bottom of the fuel water separator 154.

In some illustrative embodiments, the fuel 190 and the water 192 may reside in the same volume after separation. The separated fuel 190 may float above the separated water 192 as a separate phase, for example. The water collection reservoir 194 may be defined as a lower portion of a volume in the fuel water separator 154. Although the water collection reservoir 194 is schematically shown as a cylinder, any suitable shape capable of separating and containing water and fuel is contemplated within this disclosure.

Also, as shown, the WIF sensor 174 is positioned in the water collection reservoir 194. The WIF sensor 174 may be triggered in response to detecting when the level of the water 192 has reached a predetermined water volume. The trigger preferably indicates that a water volume is ready to be evacuated. When evacuated, a water volume preferably exits the fuel water separator 154, crosses the water line valve 172, and enters into the water filter 156. In many illustrative embodiments, the water volume may be related to the predetermined water volume by a safety factor. For example, the predetermined water volume may be 50 mL and the water volume to be evacuated may be 40 mL.

The water filter 156 includes an inlet 196 and an outlet 198. The water filter 156 is preferably designed to evacuate the first or oldest water volume out of the outlet 198 when a new water volume enters the inlet 196. For example, when the water filter 196 is first installed, there are no water volumes in the water filter 196, and upon a first evacuation, a first water volume preferably equal to the predetermined water volume enters the water filter 156. Then, additional evacuations raise the water level in the filter 156, preferably in increments of the predetermined water volume. As schematically shown, the inlet 196 is positioned adjacent the bottom of the water filter 156 and the outlet 198 is positioned adjacent the top, or at the opposite end, of the water filter 156. Preferably, only purified, clean water exits, or evacuates, from the outlet 198.

In many embodiments, the water filter 156 includes one or more hydrocarbon absorbers. The hydrocarbon absorbers preferably include the hydrocarbon absorber material described in the hydrocarbon-in-water purification systems 10, 100. The water filter 156 may include one or more types of hydrocarbon absorber materials. Stages may be defined by the water filter 156 according to the type of material. In at least one embodiment, two hydrocarbon absorber materials are utilized, such as a high capacity material and a polishing material, which respectively define a high capacity stage and a polishing stage.

Models may be generated that predict the behavior of hydrocarbon removal as water advances through the water filter 156, for example, by considering the total volume of the water filter 156 as a plurality of discrete purification beds 300 (for example, bins, stages, or zones). Water volumes can "enter" and "exit" a purification bed 300. Such models may presume that, as a new water volume enters the water filter 156, existing water volumes in the water filter 156 are displaced upward and that each water volume does not substantially mix with other water volumes as they advance through the water filter 156.

In many illustrative embodiments, each purification bed 300 preferably is defined to have a void volume equal to the predetermined water volume. For example, the total volume of the purification bed 300 may be about 75 mL with a void volume of about 40 mL and about 35 mL for absorbing material. In other words, water may be estimated by the model as advancing through the water filter 156 in discrete volumes in single file; each discrete volume residing in a discrete purification bed 300; and each new water volume displacing the existing water volumes upward by one purification bed 300.

Although any number of purification beds 300 may be defined, in the illustrated embodiment, the water filter 156 includes eight purification beds 301, 302, 303, 304, 305, 306, 307, 308 arranged from a first purification bed 301 to a final purification bed 308. Each purification bed 300 may be defined as upstream or downstream from another purification bed 300 along the water line 166.

The purification beds 300 may include a particular absorption material or a particular absorption stage. Furthermore, each purification bed 300 may correspond with a particular absorber, absorber material, or absorption stage. For example, in at least some embodiments, the last purification bed 308 corresponds to a polishing absorption stage including one polishing absorber made of a polishing material. Also, in at least one embodiment, the purification beds 301 to 307 correspond to one high capacity absorption stage having one high capacity absorber made of a high capacity material.

Each purification bed 300 may be considered to have a corresponding or associated bed loading state representing the ability of the purification bed 300 to absorb hydrocarbons from water, for example. For example, the bed loading state may increment if a water volume is fully or partially cleaned in the purification bed 300. Once a purification bed 300 absorbs enough hydrocarbons, the purification bed 300 may be considered to have reached the end of its useful life, which may be defined by the adsorption isotherm model. Accordingly, a bed loading threshold for a purification bed 300 may be determined in response to the adsorption isotherm model. The bed loading state may be set to "threshold reached" or "ineffective" to indicate that the purification bed 300 can no longer effectively absorb hydrocarbons from unclean water. Conversely, a bed loading state of "threshold not reached" or "effective" may indicate that the purification bed 300 can continue to absorb hydrocarbons and impact the purification of unclean water.

The bed loading threshold may be different for each purification bed 300 according to the adsorption isotherm model. In one example, the material, size, shape, and other characteristics of a hydrocarbon absorber may impact its capacity to absorb hydrocarbons over its useful service life, and the bed loading threshold may be adjusted accordingly. For example, a high capacity purification bed may have a bed loading threshold of 100, whereas a polishing purification bed may have a bed loading threshold of 10.

Furthermore, the position of the purification bed 300 in the water filter 156 may impact the bed loading threshold. The bed loading states are set based on modeling the multi-batch process using an adsorption isotherm model. In at least one embodiment, the bed loading threshold of the purification beds 300 may decrease in a downstream direction, recognizing that upstream purification beds 300 will absorb more hydrocarbons earlier in the useful life of the water filter 156. For example, the bed loading thresholds may be set at 100 for the first purification bed 301, 95 for the second purification bed 302, 85 for the third purification bed 303, and so on, 10 for the final purification bed 308 (for example, the final purification bed can clean 10 unclean water volumes before reaching the bed loading threshold).

Each water volume within each purification bed 300 may also be considered to have an associated purification state representing the how much the water volume has been purified. In many embodiments, new water volumes entering the water filter 156 are considered to be unclean water. Accordingly, the purification state of new water volumes are initialized or set to "unclean." However, once a water volume has resided in one or more effective purification beds 300 for the residence time threshold, the water may be considered to be clean water. Accordingly, the purification state may be set to "clean" to indicate that the water volume includes "clean water," which may be evacuated from the water filter 156. Conversely, as long as the water volume is considered to include "unclean water," the purification state may remain as "unclean."

The purification beds 300 may be arranged in any suitable manner in the water filter 156 to facilitate a FIFO process. In many embodiments, the first purification bed 301 is defined as downstream of the inlet 196 and upstream of all other purification beds 302 to 308. For example, water entering into the water filter 156 may enter into the first purification bed 301 before any other purification bed.

In various embodiments, the last purification bed 308 is defined as upstream of the outlet 198 and downstream of all other purification beds 301 to 307. For example, water exiting the water filter 156 may leave from the final purification bed 308 instead of any other purification bed.

In the illustrated embodiment, when the water 192 is introduced into the water filter 156, the water passes through the first purification bed 301, then the second purification bed 302, then the third purification bed 303, and so on until the water passes through the final purification bed 308 and exits the water filter through outlet 198.

In at least one embodiment, the purification beds 300 are arranged linearly along an axis defined along the height of the water filter 156. For example, the purification beds 300 may be defined as "stacked" along the height of the water filter 156. The shapes and sizes of the purification beds 300 may also be defined in any other suitable manner, including a concentric or nested manner, similar the absorber material 36, 46 shown in FIG. 3.

Figure 7:
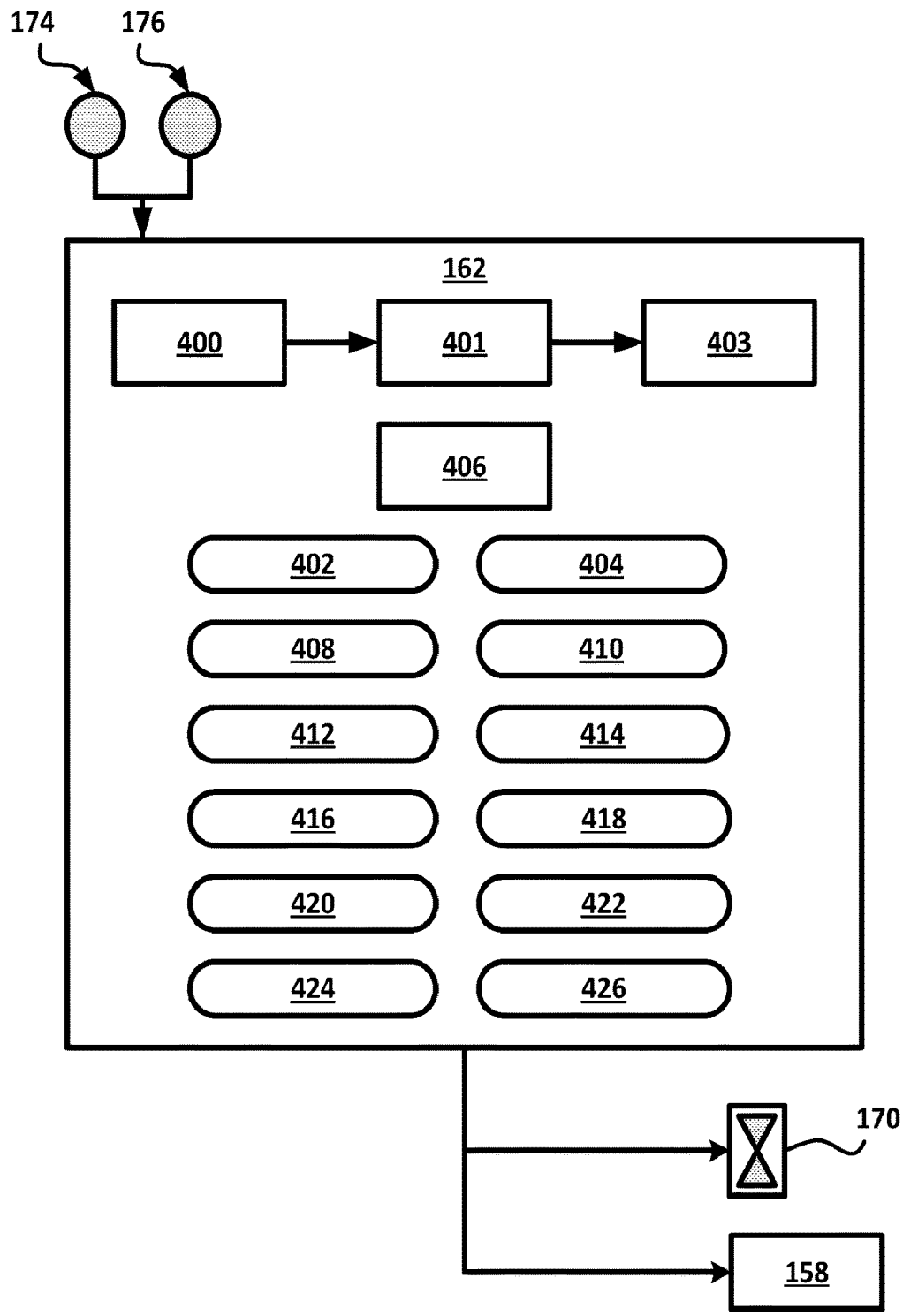
FIG. 7 is a schematic diagram view of a controller of the engine system of FIG. 4.

FIG. 7 is a schematic diagram view of the illustrative controller 162. As illustrated, the controller 162 is coupled to the WIF sensor 174 and the temperature sensor 176 to receive sensor data. The sensor data may indicate that a new water volume is ready to evacuate from a water collection reservoir, for example. A sensor data receiver 400 may determine one or more parameters in response to the sensor data, such as the water in fuel parameter 404 and the water temperature parameter 422.

The controller 162 is also shown coupled to the fuel line valve 170 and the fuel pump 158 to control water evacuation. In many illustrative embodiments, the controller 162 is operable to determine, to provide, and to store one or more parameters related to water evacuation management and control. As used herein, determining data may also include receiving data into the controller 162.

In at least some embodiments, the controller 162 includes a water filter manager 401 configured to determine various parameters, thresholds, and states to manage the evacuation of water. In various embodiments, the water filter manager 401 also includes a purification bed tracker or a water volume tracker to facilitate management of water evacuation. For example, a purification bed tracker may maintain and update a bed loading state 416 for each purification bed based on its associated kinetic model. In another example, a water volume tracker may maintain and update a purification state 410 for each water volume based on the associated kinetic model of a current purification bed. The type of tracker may be selected, for example, based on resources available in the processing or memory of the controller 162.

Further, in various embodiments, the controller 162 includes an evacuation operator 403 configured to provide one or more commands or states, such as alarm commands 408, fault states 420, and water evacuation command 420. For example, a fault state 420 may be provided to an ECU external to the controller 162. Commands and states may be represented by signals.

In at least one embodiment, the controller 162 is configured to determine an engine key parameter 402 indicating whether the engine key is turned to an "on" or "off" position. The controller 162 is also preferably configured to determine a water in fuel parameter 404 indicating whether a WIF sensor 174 is trigger or not triggered by the presence of a predetermined volume of water.

As illustrated, controller 162 is further configured to maintain a timer 406, which may track one or more periods of time that have elapsed. A different timer 406 may be maintained for each period of time being tracked. In some embodiments, a timer 406 may track a period of time that has elapsed since the WIF sensor has been triggered. In various embodiments, a timer 406 may track a residence time for a water volume, which may be defined as the period of time that the water volume has spent in one or more effective purification beds. A timer 406 may be updated in any suitable time increments, on the order of seconds, minutes, or hours, for example.

Still further, the illustrated controller 162 is configured to provide one or more alarm commands 408 in response to the expiration of the timer 406. The alarm commands 408 may warn an engine operator or take action to preserve the ability of the engine system to evacuate sufficiently purify water.

In various embodiments, the controller 162 is configured to determine one or more purification states 410 of one or more water volumes in response to one or more residence times 412 and one or more residence time thresholds 414. For example, a purification state 410 may be set to unclean until a residence time 412 meets or exceeds a residence time threshold 414 for the water volume. The purification state 410 may then be set to clean.

In further embodiments, the controller 162 is configured to determine one or more bed loading states 416 and one or more bed loading thresholds 418 for one or more purification beds. The controller 162 may compare the bed loading states 416 to associated bed loading thresholds 418. Once one or more bed loading states 416 reach associated bed loading thresholds 418, a fault state 420 may be updated to indicate an expired filter.

In many embodiments, the controller 162 is configured to determine a water temperature parameter 422 indicating the water temperature at the temperature sensor 176. The controller 162 may also determine a low temperature threshold 424 for comparison with the water temperature parameter 422. In response to the water temperature parameter 422 dropping below the low temperature threshold 424, the controller 162 may update a fault state 420 to indicate a low temperature.

In at least some illustrative embodiments, the controller 162 may determine a water evacuation command 426 in response to the engine key parameter 402 indicating an "off" position, the water in fuel parameter 404 indicating a triggered WIF sensor, the fault state 420 not indicating a lower temperature (or other faults), and a purification state 410 associated with the next dischargeable water volume in the water filter being clean. In various illustrative embodiments, evacuation operator 403 provides the evacuation command 426 preferably to close the fuel line valve 170 and to reverse the fuel pump 158.

Processes that may be implemented on the controller 162 are described herein in more detail with respect to FIGS. 8, 9, 10, and 11.

Figure 8:
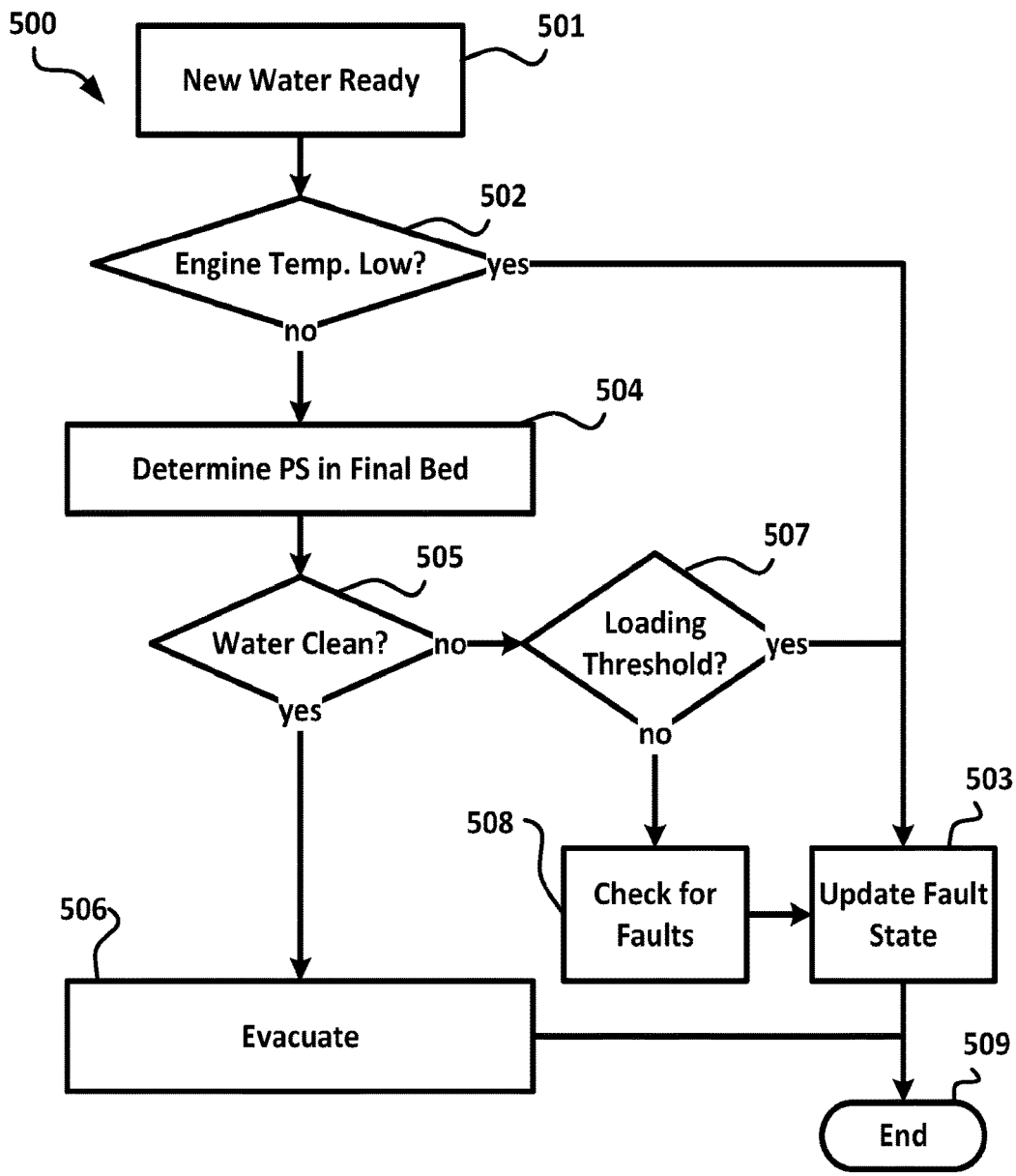
FIG. 8 is a schematic diagram view of a process for checking water evacuation conditions of the process of FIG. 5.

FIG. 8 is a schematic diagram view of an illustrative process 202 for checking water evacuation conditions. The process 202 begins with determining that a new water volume is ready to evacuate in step 501. Then, in step 502, whether a water temperature is below a low temperature threshold is determined. If the water temperature is below the low temperature threshold, the process 202 bypasses the step of introducing a new water volume (for example, evacuating a water volume) and continues on to step 503.

In step 503, a fault state is updated in response to one or more conditions, such as a low temperature, an excess of water, and an expired filter. Each of the conditions may indicate that the new water volume cannot be evacuated, and thus an attempted evacuation has failed.

However, if in step 502, the water temperature is not below the low temperature threshold, the process 202 may continue onto step 504.

In many embodiments, the process 202 may be used with a water filter that contains one or more water volumes and a plurality of purification beds arranged from a first purification bed to the final purification bed such that the first purification bed receives new water introduced into the water filter from a water collection reservoir and the final purification bed discharges water from the water filter. The one or more water volumes preferably reside in the plurality of purification beds.

According to step 504, the purification state of the water volume in the final purification bed, which would be discharged if a new water volume were introduced into the water filter, is determined. The purification state may be determined in response to tracking the residence time of the next dischargeable water volume in at least one of the purification beds.

In continuing onto step 505, whether the dischargeable water volume in the final purification bed in the water filter is clean or not clean is determined, for example, in response to the purification state determined in step 504. If the dischargeable water volume is clean, the process 202 may continue onto step 506 to evacuate water from the water collection reservoir to introduce a new water volume into the first purification bed of the water filter. On the other hand, if the dischargeable water volume is not clean, the process continues onto step 507 to determine whether one or more purification beds have reached associated bed loading thresholds.

According to step 506, a new water volume is introduced into the first purification bed in response to determining that the dischargeable water volume is clean. The new water volume, once introduced, moves each of the one or more water volumes in the water filter such that the dischargeable water volume leaves the final purification bed and a next dischargeable water volume of the one or more water volumes enters the final purification bed.

On the other hand, in step 507, whether the bed loading state associated with at least one of the purification beds exceeds an associated bed loading threshold is determined. The bed loading state may be determined in response to tracking the residence time of water in the at least one purification bed, for example.

In various embodiments, a filter may be determined to be expired in response to determining that one or more purification beds have bed loading states that exceed their associated bed loading thresholds. If the remaining effective purification beds in the water filter have insufficient capacity to clean one water volume, the water filter may be incapable of cleaning another water volume. The water filter may then be deemed expired. In one example, the filter may be considered expired if the final purification bed has reached its associated bed loading threshold. In another example, the filter may be considered expired if some or all of the purification beds have reached their associated bed loading thresholds.

Continuing on from step 507, faults other than lower temperature, excess water, or expired filter may be checked for in step 508, such as excessive restrictions or a valve failure during evacuation. Then, in step 503, the fault states are updated and may be made available on a controller, for example, for diagnosis.

After either step 506 or 503, the process 202 is then finished at step 509. In this manner, water volumes that enter the water filter may be evaluated to facilitate only clean water being evacuated from the water filter.

Figure 9:
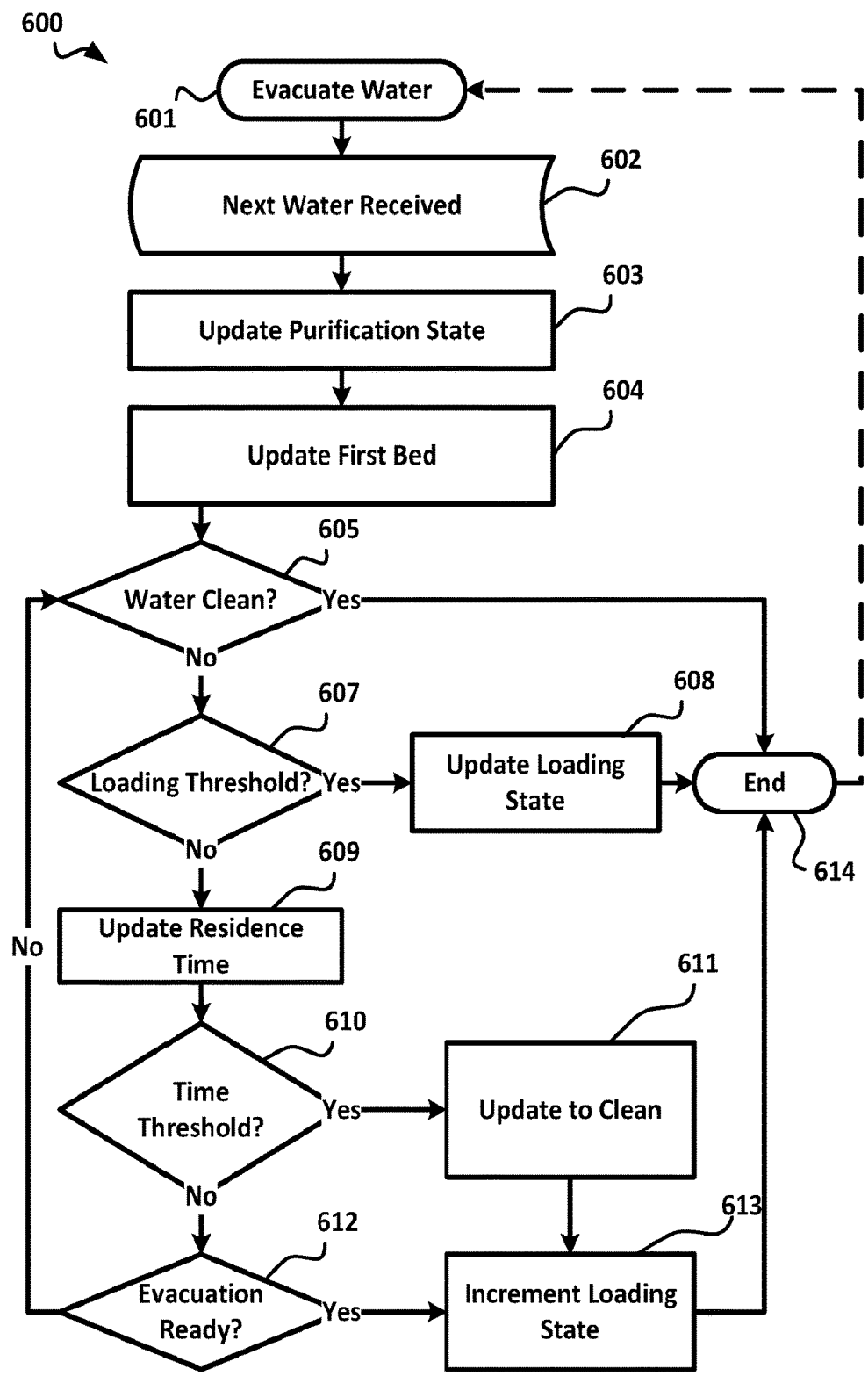
FIG. 9 is a schematic diagram view of a process for maintaining a purification bed tracker.

FIG. 9 is a schematic diagram view showing an illustrative process 600 for tracking a purification state (PS) and a bed loading state (LS) in a purification bed tracker, as water volumes advance through an illustrative water filter. In many embodiments, each purification bed in the water filter may be associated with a different purification bed tracker and, at any given time, a different water volume.

In the illustrated embodiment, the purification bed tracker keeps track of various water volumes Y that advance through purification bed X. For example, the process 600 may begin with a water evacuation in step 601, which can be initiated by a water evacuation command form an illustrative controller. This may cause a previous water volume Y−1 to exit purification bed X in a downstream direction and cause a water volume Y to enter purification bed X from an upstream direction in step 602.

In many illustrative embodiments, the purification bed tracker maintains parameters, such as a current residence time of a current water volume Y residing in the associated purification bed X, a current purification state of the current water volume Y, and a bed loading state of the associated purification bed X. The parameters may be stored in a data structure, such as a table, which may be updated by the process 600.

The process 600 may track the purification state of the water volume Y from 1 to 0 with PS=1 representing an unclean state and PS=0 representing a clean state. In at least some illustrative embodiments, the purification state is tracked as a Boolean value as only 0 or 1. According to process 600 a water volume is preferably considered to be clean only when the water volume has resided in one or more effective purification beds for a total residence time equal to a full residence time threshold. For example, when an unclean water volume (PS=1) resides in a first effective purification bed for half of the residence time threshold and resides in a second effective purification bed for another half of the residence time threshold, the purification state may be considered to be clean (PS=0) upon evacuation from the second effective purification bed.

The tracking process 600 may overestimate the loading of the purification bed X to preferably maintain a margin of safety in preventing unclean water from reaching the environment. The process 600 may track the bed loading state in integers, for example, integers ranging from LS=0 (no bed loading) to LS=100 (ineffective if the bed loading threshold is 100). Accordingly, the bed loading state is effective for LS=0 through LS=99. The bed loading state may be incremented (+1), for example, with each increment representing the absorption of the hydrocarbons of one full water volume into the purification bed X. However, if a water volume Y exits the purification bed X before the residence time threshold is reached, the bed loading state of the purification bed X is still incremented (LS=LS+1) even though the full amount of hydrocarbons from the water volume Y may not have been absorbed into the purification bed X. The bed loading state is also incremented (LS=LS+1) when the water volume Y exits the purification bed X after a full residence time threshold. Thus, the bed loading state of the purification bed X may be overestimated.

In many illustrative embodiments, upon the new water volume entering the water filter, a current purification state may be updated for purification bed X from the purification state of the upstream purification bed X−1 in step 603. Further, the current purification state of the purification bed tracker associated with the first purification bed (X=1) may be updated to unclean (PS=1) in step 604 indicating that the new water volume has a full amount of hydrocarbons.

In step 605, whether the current water volume Y is clean or not is determined in step 605. For example, if the purification state is clean (PS=0), then the water volume is determined to include clean water. If the water volume is not clean, whether the current bed loading threshold of purification bed X has been reached (has become ineffective) is determined in step 607.

If the current bed loading state has reached a bed loading threshold, a fault state may be updated to indicate that the purification bed X has reached the bed loading threshold (is ineffective) in step 608. The purification state and the residence time are preferably not updated, because as long as the water volume Y remains in the ineffective purification bed X, the water volume Y will not be further purified. However, if the current bed loading state has not reached the bed loading threshold (is effective), the current residence time of the current water volume Y is updated in step 609 (for example, is incremented by one hour).

After step 609, whether the current residence time is equal to or greater than a residence time threshold in purification bed X is determined in step 610. If the current residence time is meets or exceeds the residence time threshold, the current purification state may be updated to clean in step 611. Furthermore, the current bed loading state may be incremented in step 613 to indicate that the hydrocarbons in one water volume have been absorbed into purification bed X.

However, if the current residence time is less than the residence time threshold, whether another water volume is ready to evacuate is determined in step 612. If the next evacuation is not ready, whether the water volume is clean is checked in a loop back to step 605.

However, if the next evacuation is ready, the water volume Y may be evacuated. Further, the current bed loading state may be incremented (LS=LS+1) in step 613 to overestimate the amount of hydrocarbons that have been absorbed into the purification bed X. Furthermore, the current water volume Y may be evacuated from the purification bed X before the residence time threshold has been reached, and the water volume Y is still considered unclean (PS=0).

After any of steps 605, 608, or 613, the process is then finished at step 614. The process 600 may be repeated, however, each time a new volume of water is evacuated. In this manner, each water volume in the water filter may be tracked for purity based on residence time and each purification bed may be tracked until the end of its useful service life based on water volumes cleaned.

Figure 10:
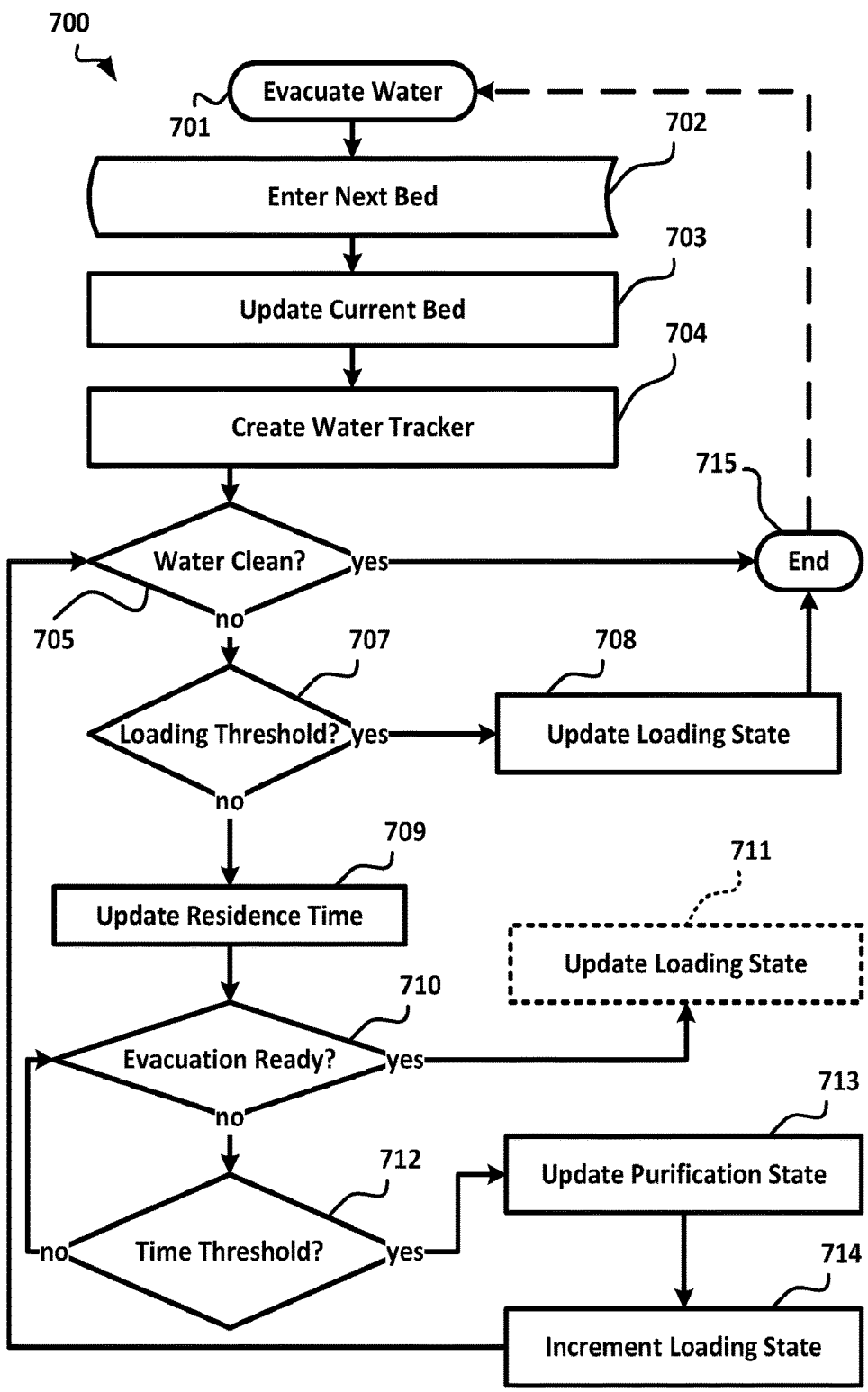
FIG. 10 is a schematic diagram view of a process for maintaining a water volume tracker.

FIG. 10 is a schematic diagram view showing an illustrative process 700 for tracking a purification state and a bed loading state in a water volume tracker as water volumes advance through an illustrative water filter. In many embodiments, water volume in the water filter may be associated with a different water volume tracker and, at any given time, a different purification bed. More specifically, a new water volume tracker may be created each time a new water volume enters the water filter.

In the illustrated embodiment, the water volume tracker keeps track of a water volume Y as it advances through various purification beds X. For example, process 700 may begin with a water evacuation in step 701. This may cause the water volume Y to exit a previous purification bed X−1 in a downstream direction and to enter a current purification bed X in step 702.

In many illustrative embodiments, the water volume tracker maintains parameters, such as a current residence time of the associated water volume Y, a current purification state of the associated water volume Y, a current purification bed X in which the associated water volume resides, and a current bed loading state of the current purification bed X. The parameters may be stored in a data structure, such as a table, which may be updated by the process 700.

The process 700 may track the purification state of the water volume Y in a range between 0 and 1, for example, in increments of tenths (0.1) with PS=0 representing a clean state and PS=1 representing an unclean state. According to process 700 a water volume is preferably considered to be clean only when the water volume has resided in one or more effective purification beds for a total residence time equal to a full residence time threshold.

In particular, the process 700 may maintain a data structure (for example, table) representing the kinetic profile of one or more purification beds. Each table may associate a series of residence time thresholds (indexed by $T_R$), representing the time a water volume Y spends in an effective purification bed, with a series of purification states (PS), representing the normalized concentration of hydrocarbons estimated to be remaining in the water volume (for example, water volume purity). Each kinetic profile may be determined based on associated kinetic parameters for each purification bed. In one illustrative example, a table representing the kinetic profile may associate:

0 hour residence time threshold ($T_R=0$) and 100% hydrocarbons remaining (PS=1);

1 hour residence time threshold ($T_R=1$) and 20% hydrocarbons remaining (PS=0.2);

3 hours residence time threshold (T=2) and 10% hydrocarbons remaining (PS=0.1); and 6 hours residence time threshold ($T_R=3$) and 0% hydrocarbons remaining (PS=0).

In various embodiments, the difference between residence time thresholds and the purification states may define various purification changes over time. In one example, the rate of hydrocarbon absorption may be higher between hours 0 and 1 (for example, 80% hydrocarbon removed per hour) than between hours 1 and 3 (for example, 5% hydrocarbon removal per hour). In other words, each subsequent purification changes over time may be less than an immediately preceding purification change over time in some embodiments. Purification changes over time may depend on kinetic or adsorption isotherm parameters, such as the temperature and the type of absorber material in the purification bed. Different tables may be used to represent different sets of kinetic and adsorption isotherm parameters for one or more purification beds.

In many illustrative embodiments, the purification state for water volume Y (PS) may be updated whenever the total residence time reaches a residence time threshold ($T_R$). Even when a water volume Y is evacuated before a next residence time threshold is reached, the water shot tracker may continue to update a residence time in a timer, for example, to keep track of the total residence time in the next effective purification bed X+1.

The process 700 may track the bed loading state for purification bed X from LS=0 (no bed loading) to LS=100 (ineffective if the bed loading threshold is 100) in tenths (0.1) instead of whole integers. Because the amount of hydrocarbons removed from the water volume Y is tracked in tenths (0.1), the difference between purification states may be used to increment the bed loading. For example, once a total residence time of the water volume Y reaches 1 hour, the current purification state may be reduced from PS=1 to PS=0.2 and the bed loading state for purification bed X may be increased by the difference (LS=LS+0.8).

The process 700 may overestimate the bed loading states, for example, by incrementing the bed loading state if a water volume Y is evacuated before the next loading threshold is reached. For example, a water volume tracker for the water volume Y that enters purification bed X at 0 hours and leaves after only 30 minutes may increment the current bed loading state as if the water volume Y resided in the purification bed X until the next residence time threshold at 1 hour (LS=LS+0.8). In this manner, the process 700 may provide a margin of safety in preventing the evacuation of unclean water from the water filter.

In many illustrative embodiments, upon a new water volume entering the water filter, the current purification bed for water volume Y may be updated from X−1 to X in step 703. Further, a water volume tracker may be created and associated with the new water volume having a current purification bed associated with the first purification bed (X=1) and the purification state being not clean (PS=1) in step 704.

In step 705, whether the current water volume Y is clean is determined. For example, if the purification state is clean (PS=0), then the water volume is determined to include clean water. If the water volume is not clean, whether the current bed loading threshold of purification bed X has been reached (has become ineffective) is determined in step 707.

If the current bed loading state has reached a bed loading threshold, a fault state may be updated to indicate that the purification bed X has reached a bed loading threshold (is ineffective) in step 708. The purification state and the residence time are preferably not updated, because as long as water volume Y remains in the ineffective purification bed X, the water volume Y will not be further purified. However, if the current bed loading state has not reached the bed loading threshold (is effective), the current residence time of water volume Y is updated in step 709 (for example, is incremented by one hour).

After step 709, whether another water volume is ready to evacuate is determined in step 710. If the next evacuation is ready, the water volume Y may be evacuated. Further, the current bed loading state may be incremented (LS=LS+PS($T_R$)−PS($T_R$+1)) in optional step 711 to overestimate the amount of hydrocarbons that have been absorbed into the purification bed X. Still further, the water volume Y may enter purification bed X+1 and whether the bed loading limit of purification bed X+1 has been reached is determined in a loop back to step 707 (not illustrated), and the purification bed X+1 may be considered the current purification bed X in subsequent steps of the process 700.

However, if the next evacuation is not ready, whether the current residence time is equal to or greater than the next residence time threshold ($T_R$+1) is determined in step 712. If the current residence time meets or exceeds the residence time threshold, the current purification state may be updated to a next purification state (PS=PS($T_R$+1)) associated with the next residence time threshold ($T_R$+1) in step 713.

Further, the bed loading state (LS) for purification bed X may be incremented accordingly in step 714 (LS=LS+PS($T_R$)−PS($T_R$+1)). For example, the bed loading state (LS) may be incremented by the difference between the purification state of the current residence time threshold (PS($T_R$)) and the purification state of the next residence time threshold (PS($T_R$+1)). After step 714, whether the water volume Y is clean is determined in a loop back to step 705.

After any of step 705, 708, the process is then finished at step 715. The process 700 may be repeated, however, each time a new volume of water is evacuated. In this manner, each water volume in the water filter may be tracked for purity based on residence time and each purification bed may be tracked until the end of its useful service life based on water volumes cleaned.

Some of the advantages of the disclosed systems and constructions are further illustrated by the following example. The particular materials, amounts and dimensions recited in this example, as well as other conditions and details, should not be construed to unduly limit the present disclosure.

EXAMPLES

Determination of Saturation and Polishing Capacities

The Freundlich Isotherm constants, $K_f$ and 1/n, are fitting constants that indicate the extent of interaction between the adsorbate and adsorbent. In this example the filter is designed to remove diesel hydrocarbons from water. In a typical experiment the adsorbent properties of various materials were determined as follows. Various masses of each material (50 mg-500 mg) were challenged with 20 mL of a B5 diesel fuel-in-water dispersion (typically 1000-2500 ppm hydrocarbon content). The samples were equilibrated overnight and the equilibrium hydrocarbon concentration for each sample was determined using GC-MS (Gas Chromatography-Mass Spectrometry) relative to an n-hexadecane (C16) standard. The data was worked up using a linearized form of the empirical Freundlich isotherm expression:

$$\log_{10} q = \log_{10} \frac{x}{m} = \log_{10} K_f + \frac{1}{n} \log_{10} c_e$$

where q is the adsorbent loading in mg of hydrocarbons/g adsorbent (x/m), $c_e$ is the equilibrium hydrocarbon concentration in the water, and $K_f$ and 1/n are the isotherm parameters that are material dependent and temperature dependent. In a multi-component adsorbate, such as diesel fuel, the isotherm parameters tended to be dependent on the initial fuel-in-water dispersion concentration. Isotherms constants and capacity values for a variety of materials are presented in Table 1 (materials challenged with 2500 ppm B5 diesel fuel-in-water dispersion) and Table 2 (materials challenged with 1000 ppm B5 diesel fuel-in-water dispersion).

TABLE 1

Freundlich Isotherm Constants for Materials Challenged with 2500 ppm B5 Diesel Fuel-in-Water dispersion

| Material | Freundlich Isotherm Constants | | Material Capacity (mg hydrocarbon/gram material) | |
|---|---|---|---|---|
| | Log $K_f$ | 1/n | Polishing, $q_t$ ($c_e$ = 2 ppm) | Saturation, $q_{sat}$ ($c_e$ = 2500 ppm) |
| Norit GCN 1240 | 1.29 | 0.43 | 26.4 | 568 |
| Silcarbon K48 | 0.00 | 0.86 | 1.8 | 854 |
| Norit ROW 0.8 Supra | 1.69 | 0.45 | 67 | 1613 |
| Obermeier TyP Aqua S816 | 1.36 | 0.43 | 31 | 661 |
| Chemviron Carbosrb 28FB | 1.99 | 0.30 | 119 | 981 |
| Calgon Filtersorb F300 | 1.88 | 0.31 | 94 | 853 |
| Calgon Filtersorb F400 | 1.55 | 0.46 | 49 | 1356 |

TABLE 2

Freundlich Isotherm Constants for Materials Challenged with 1000 ppm B5 Diesel Fuel-in-Water dispersion

| Material | Freundlich Isotherm Constants | | Material Capacity (mg hydrocarbon/gram material) | |
|---|---|---|---|---|
| | Log $K_f$ | 1/n | Polishing, $q_t$ ($c_e$ = 2 ppm) | Saturation, $q_{sat}$ ($c_e$ = 1000 ppm) |
| Chemviron Carbsorb 28FB | 1.54 | 0.40 | 45.7 | 561 |
| Polyurethane foam (Restek; Catalog #22957) | −2.69 | 2.08 | 0.0[a] | 3686 |

[a] The polyurethane foam cannot purify water down to 2 ppm, according to the Freundlich Isotherm parameters.

Norit GCN 1240 is commercially available from Cabot Corporation (Boston, Mass.).

Silcarbon K48 is commercially available from Silcarbon Aktivkohle GmbH (Kirchhundem, Germany).

Norit ROW 0.8 Supra is commercially available from Cabot Corporation (Boston, Mass.).

Obermeier TyP Aqua S816 is commercially available from Kurt Obermeier GmbH & Co. (Bad Berleburg, Germany).

Chemviron Carbosrb 28FB is commercially available from Chemviron Carbon (Feluy, Belgium).

Calgon Filtersorb F300 is commercially available from Calgon Carbon Corporation (Moon Township, Pa.).

Calgon Filtersorb F400 is commercially available from Calgon Carbon Corporation (Moon Township, Pa.).

Example A

The adsorbent properties of a high capacity carbon (Silcarbon K48) and a polishing carbon (Norit GCN 1240) were determined by running an isotherm experiment as described previously. Isotherm parameters for a 2500 ppm B5 diesel fuel-in-water dispersion challenge are presented in Table 1. The target cleanliness for this example is 2 ppm.

As observed, the Silcarbon K48 carbon has a higher saturation capacity, whereas the Norit GCN 1240 carbon has a higher loading capacity when targeting an outlet hydrocarbon concentration of 2 ppm. Therefore, a hydrocarbon in water purification system including Silcarbon K48 high capacity stage followed by a Norit GCN 1240 polishing stage will have a longer lifetime than an equal mass system including only Norit GCN 1240 polishing carbon.

By breaking the absorbent bed into two stages, where the first uses a high capacity material and the second stage uses a polishing material, we can increase the lifetime of a water purification filter. Calculated results verify this increase in lifetime when the bed is challenged sequentially with 50 mL water samples that have an initial hydrocarbon concentration of 2500 ppm. In this model the water and carbon are allowed to equilibrate completely according to the Freundlich Isotherm expression before being transferred to the next filter stage or by leaving the element. The Freundlich isotherm parameters for the high capacity material and polishing material are based off of isotherm experiments using diesel fuel-in-water dispersion challenge (Table 1). This model was used in all examples. In this example both materials were activated carbons.

A filter containing 357 g of Norit GCN 1240 will purify 68 L of water before breaking through the target concentration of 2 ppm. By breaking the filter into two stages of Silcarbon K48 (high capacity) and Norit GCN1240 (polishing) the optimal lifetime in the multi-batch model is 60% by weight high capacity carbon, and 40% by weight polishing carbon. In this ratio the will purify 82 L before breakthrough at 2 ppm. This is a 21% increase in hydrocarbon absorber filter lifetime.

Example B

A filter containing 357 g of Chemviron Carbsorb 28FB will purify 112 L of water before breaking through the target concentration of 2 ppm. By breaking the filter into two equal mass stages of Norit ROW 0.8 Supra (high capacity carbon) and Carbsorb 28FB (polishing carbon), the lifespan of the filter is increased to 148 L of water. Further improving the system finds that the optimal life in the multi-batch model is 90% by weight high capacity carbon, and 10% by weight polishing carbon. These ratios may differ for different specific adsorbents. In this ratio the filter will purify 167 L before breakthrough at 2 ppm. This is a 49% increase in hydrocarbon absorber filter lifetime.

Example C

In another example of high capacity materials, a typical polishing carbon was compared to a polyurethane foam (Restek; Catalog #22957). The polyurethane and polishing carbon were challenged with 1000 ppm hydrocarbons (B5) in water dispersion to determine the Freundlich Isotherm parameters Log K and 1/n (Table 2). From these values the loading at saturation and at a target cleanliness (polishing) are computed. Here the target cleanliness is 2 ppm hydrocarbons in water. From experimental data, the Restek polyurethane cannot purify the water down to the intended cleanliness alone ($q_t$=0 mg hydrocarbons/g material). In contrast, the typical polishing carbon has a capacity of $q_t$=45.7 mg hydrocarbon/gram of carbon at the 2 ppm target cleanliness.

The Restek polyurethane has a significantly higher saturation capacity than the polishing carbon (Restek polyurethane: $q_{sat}$=3686 mg hydrocarbons/g material; polishing carbon: $q_{sat}$=561 mg hydrocarbons/g material). Thus a two-stage filter having a high-capacity polymer stage followed by a polishing carbon has a longer expected lifetime than a filter of carbon alone.

For example, in a multi-batch application (challenge water=1000 ppm hydrocarbons in water) a calculated lifetime of a 250 g polishing carbon element is 112 L of before breaking through the target concentration of 2 ppm. A filter element designed using 50 g of Restek polyurethane followed by 200 g of polishing carbon has a calculated lifetime to 132 L before breakthrough. This is an 18% increase in hydrocarbon absorber filter lifetime.

The order of the absorbent stages is important to increase the overall lifetime of the hydrocarbon in water purification system. If the stages in the previous example are reversed (200 g polishing carbon followed by 50 g of Restek polyurethane) the lifetime of the system is decreased to 80 L before breakthrough. This is a 29% decrease in hydrocarbon absorber filter lifetime.

Example D

A multi-batch application filter has a high capacity stage of 120 g of Calgon Filtersorb F400 carbon followed by a polishing stage of 60 g of Chemviron Carbsorb 28FB. The filter is challenged with sequential 40 mL volumes of 2500 ppm hydrocarbon (B5 diesel fuel)-in-water dispersions. The filter will purify 64 L of water before breaking through at 2 ppm hydrocarbon content. This is an increase in lifetime of 28% over an equivalent mass filter containing only polishing material (50 L lifetime).

The increase in lifetime occurs over a range of water purification targets. If the maximum hydrocarbon concentration allowed to leave the bed is 20 ppm the high capacity/polishing filter described above will purify 69 L of water before breakthrough. This is an increase in lifetime of 28% over an equivalent mass filter containing only polishing material (54 L lifetime).

Alternatively, if the filter includes a high capacity stage of 120 g of Norit ROW 0.8 Supra carbon followed by a polishing stage of 60 g of Chemviron Carbsorb 28FB the filter will purify 70 L of water before breaking through at 2 ppm hydrocarbon content. This is an increase in lifetime of 40% over an equivalent mass filter containing only polishing material (50 L lifetime).

Example E

A multi-batch application filter has a high capacity stage of 70 g of Norit Row 0.8 Supra carbon followed by a polishing stage of 70 g of Chemviron Carbsorb 28FB carbon. The filter is challenged with sequential 50 mL volumes of 1000 ppm hydrocarbon (B5 diesel fuel)-in-water dispersion. The filter will purify 80 L of water before breaking through at 5 ppm hydrocarbon content. This is an increase in lifetime of 36% over an equivalent mass filter containing only polishing material (59 L lifetime)

Example F

A multi-batch application filter has a high capacity stage of 140 g of Silcarbon K48 carbon followed by a polishing stage of 140 g of Obermeier TyP Aqua S816. The filter is challenged with sequential 50 mL volumes of 2500 ppm hydrocarbon (B5 diesel fuel)-in-water dispersion. The filter will purify 64 L of water before breaking through at 2 ppm hydrocarbon content. This is an increase in lifetime of 8% over an equivalent mass filter containing only polishing material (59 L lifetime).

Example G

A multi-batch application filter has a high capacity stage of 30 g of polyurethane foam (Restek; Catalog #22957)

followed by a polishing stage of 60 g of Obermeier TyP Aqua S816. The filter is challenged with sequential 40 mL volumes of 2500 ppm hydrocarbon (B5 diesel fuel)-in-water dispersion. The filter will purify 18 L of water before breaking through at 2 ppm hydrocarbon content. This is an increase in lifetime of 50% over an equivalent mass filter containing only polishing material (12 L lifetime).

Example H

A filter design that starts with a high capacity material can have the lifetime increased by replacing the downstream portion of the filter with a polishing material. For example, a filter is designed to purify sequential 10 mL volumes of 1000 ppm hydrocarbon (B5 diesel fuel)-in-water dispersion. A filter including 37.5 g of high capacity material (Norit ROW 0.8 Supra) will purify 26 L of water before breaking through at 5 ppm hydrocarbon content. Changing the design to include 30 g of high capacity carbon material followed by 7.5 g of polishing material (Calgon Filtersorb F300) increased the lifetime to 29 L of water purification. This is an increase in lifetime of 12%.

Example I

A multi-batch application filter has a high capacity stage of 150 g of polyurethane foam (Restek; Catalog #22957) followed by a polishing stage of 150 g of Norit ROW 0.8 Supra carbon. The filter is challenged with sequential 100 mL volumes of 2500 ppm hydrocarbon (B5 diesel fuel)-in-water dispersion. The filter will purify 131 L of water before breaking through at 10 ppm hydrocarbon content. This is an increase in lifetime of 24% over an equivalent mass filter containing only polishing material (106 L lifetime).

Example J

A multi-batch application filter has a high capacity stage of 2.25 kg of Norit ROW 0.8 Supra carbon followed by a polishing stage of 3.75 kg Chemviron Carbsorb 28FB carbon. The filter is challenged with sequential 1 L volumes of 1500 ppm hydrocarbon (B5 diesel fuel)-in-water dispersion. The filter will purify 3260 L of water before breaking through at 1 ppm hydrocarbon content. This is an increase in lifetime of 31% over an equivalent mass filter containing only polishing material (2490 L lifetime).

Example K

The filter from Example J can be further enhanced by using multiple high capacity materials in series. The high capacity stage in the filter above is changed to contain 750 g of polyurethane foam (Restek; Catalog #22957) followed by 1.5 kg of Norit Row 0.8 Supra carbon; the polishing stage is unchanged. The filter is challenged with sequential 1 L volumes of 1500 ppm hydrocarbon (B5 diesel fuel)-in-water dispersion. The filter will purify 4137 L of water before breaking through at 1 ppm hydrocarbon content. This is an increase in lifetime of 66% over an equivalent mass filter containing only polishing material (2490 L lifetime). If the high capacity stage is only polyurethane foam the lifetime is decreased to 3760 L.

Example L

A multi-batch application filter has a high capacity stage of 70 g of Calgon Filtersorb F400 carbon followed by a polishing stage of 70 g of Chemviron Carbsorb 28FB carbon. The filter is challenged with sequential 50 mL volumes of 500 ppm hydrocarbon (B5 diesel fuel)-in-water dispersion. The filter will purify 106 L of water before breaking through at 10 ppm hydrocarbon content. This is an increase in lifetime of 8% over an equivalent mass filter containing only polishing material (98 L lifetime).

Example M

The high capacity stage in Example L was replaced with 70 g of Norit ROW 0.8 Supra carbon; the polishing stage is unchanged. The filter is challenged with sequential 50 mL volumes of 500 ppm hydrocarbon (B5 diesel fuel)-in-water dispersion. The filter will purify 120 L of water before breaking through at 10 ppm hydrocarbon content. This is an increase in lifetime of 22% over an equivalent mass filter containing only polishing material (98 L lifetime).

Example N

The high capacity stage in Example M was increased to 105 g. The polishing stage was decreased to 35 g. The filter is challenged with sequential 50 mL volumes of 500 ppm hydrocarbon (B5 diesel fuel)-in-water dispersion. The filter will purify 101 L of water before breaking through at 500 ppb hydrocarbon content. This is an increase in lifetime of 42% over an equivalent mass filter containing only polishing material (74 L lifetime).

Thus, embodiments of HYDROCARBON-IN-WATER PURIFICATION SYSTEM are disclosed. One skilled in the art will appreciate that the purification systems described herein can be practiced with embodiments other than those disclosed. The disclosed embodiments are presented for purposes of illustration and not limitation.

The invention claimed is:

1. A hydrocarbon-in-water purification system, comprising:
  a high capacity hydrocarbon absorber stage comprising a high capacity hydrocarbon absorber material and an inlet configured to receive a hydrocarbon-in-water dispersion from a fuel system, wherein when the hydrocarbon-in-water dispersion is a 2500 ppm 5% biodiesel blend-in-water dispersion, and the high capacity hydrocarbon absorber material has a saturation capacity greater than 750 mg of hydrocarbon per gram of material; and
  a polishing hydrocarbon absorber stage in liquid communication and downstream of the high capacity hydrocarbon absorber stage, the polishing hydrocarbon absorber stage comprising polishing activated carbon, wherein when the hydrocarbon-in-water dispersion is a 2500 ppm 5% biodiesel blend-in-water dispersion and the water has a target cleanliness of 2 ppm hydrocarbon, the polishing activated carbon has a polishing capacity greater than 25 mg of hydrocarbon per gram of material; wherein
  the high capacity hydrocarbon absorber material has a greater saturation capacity than the polishing activated carbon and the polishing activated carbon having a greater polishing capacity than the high capacity hydrocarbon absorber material.

2. The system according to claim 1 wherein, the high capacity hydrocarbon absorber stage and the polishing hydrocarbon absorber stage are contained within a filter housing.

3. The system according to claim 1, wherein the high capacity hydrocarbon absorber material comprises activated carbon.

4. The system according to claim 1, wherein the high capacity hydrocarbon absorber material comprises polyethylene, polyurethane, polyester, or combinations thereof.

5. The system according to claim 4 wherein the high capacity hydrocarbon absorbing material comprises polyethylene, polyurethane, or polyester and defines a non-woven fabric layer or a foam element.

6. The system according to claim 1 wherein the high capacity hydrocarbon absorber material has a first weight and the polishing activated carbon has a second weight and the first and second weight equal a total absorber weight, and the first weight is in a range from 10% to 90% of the total weight.

7. The system according to claim 6 wherein the total absorber weight absorbs at least 10% more hydrocarbon than the polishing activated carbon alone.

8. The system according to claim 1 wherein the high capacity hydrocarbon absorber stage defines a first volume and the polishing hydrocarbon absorber stage defines a second volume and the first volume and the second volume are contained within a filter housing, and a porous dividing element separates the first volume from the second volume.

9. An engine fuel and water separation system comprising:
   a fuel and water separator system fluidly connected to an engine fuel line and having a water drain outlet; and
   a hydrocarbon-in-water purification system, according to claim 1, in fluid communication with the water drain outlet.

10. The engine fuel system according to claim 9, wherein the engine fuel line contains diesel fuel.

11. The engine fuel system according to claim 9, wherein the fuel and water separator system comprises a fuel filter water separator fluidly connected between the fuel line and the hydrocarbon-in-water purification system, the fuel filter water separator removing particulates from the hydrocarbon fuel and forming a hydrocarbon-in-water dispersion that passes into the hydrocarbon-in-water purification system.

12. The engine fuel system according to claim 11, wherein the hydrocarbon-in-water dispersion has a hydrocarbon content of at least 500 ppm and the hydrocarbon-in-water purification system has a clean water outlet downstream of the polishing hydrocarbon absorber stage and the clean water outlet discharges clean water having a hydrocarbon content of 2 ppm or less.

13. A method comprising:
   forming a hydrocarbon-in-water dispersion from a fuel system;
   passing the hydrocarbon-in-water dispersion through a high capacity hydrocarbon absorber stage comprising a high capacity hydrocarbon absorber material and removing at least a portion of hydrocarbon from the dispersion to form a permeate that is substantially water, wherein when the hydrocarbon-in-water dispersion is a 2500 ppm 5% biodiesel blend-in-water dispersion, and the high capacity hydrocarbon absorber material has a saturation capacity greater than 750 mg of hydrocarbon per gram of material; and
   passing the permeate through a polishing hydrocarbon absorber stage comprising polishing activated carbon to adsorb hydrocarbon and form a polished water stream, wherein when the hydrocarbon-in-water dispersion is a 2500 ppm 5% biodiesel blend-in-water dispersion and the water has a target cleanliness of 2 ppm hydrocarbon, the polishing activated carbon has a polishing capacity greater than 25 mg of hydrocarbon per gram of material; wherein
   the high capacity hydrocarbon absorber material has a greater saturation capacity than the polishing activated carbon and the polishing activated carbon having a greater polishing capacity than the high capacity hydrocarbon absorber material.

14. The method according to claim 13 wherein the hydrocarbon-in-water dispersion comprises at least 100 ppm hydrocarbon and the polished water stream comprises less than 5 ppm hydrocarbon.

15. The method according to claim 13 wherein the hydrocarbon is diesel fuel.

16. The method according to claim 13 wherein the hydrocarbon-in-water dispersion is provided by a fuel filter water separator.

17. The method according to claim 13 further comprising contacting the hydrocarbon-in-water dispersion with a high capacity hydrocarbon absorbing material being a polymeric material.

18. The method according to claim 13 further comprising contacting the hydrocarbon-in-water dispersion with a high capacity hydrocarbon absorbing material being a non-woven fabric layer or a foam element.

* * * * *